(12) United States Patent  (10) Patent No.: US 6,726,189 B2
Folchert et al.  (45) Date of Patent: Apr. 27, 2004

(54) CLOSED LEVEL CONTROL SYSTEM FOR A VEHICLE

(75) Inventors: Uwe Folchert, Lauenau (DE); Christoph Behmenburg, Lauenau (DE); Helge Westerkamp, Hannover (DE); Werner Grabherr, Neustadt (DE); Dierk Hein, Wedemark (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 10/103,843

(22) Filed: Mar. 25, 2002

(65) Prior Publication Data

US 2002/0136645 A1 Sep. 26, 2002

(30) Foreign Application Priority Data

Mar. 24, 2001 (EP) .............................. 01107341
Oct. 30, 2001 (EP) .............................. 01125833
Mar. 1, 2002 (EP) .............................. 02004708

(51) Int. Cl.$^7$ ................................................ F16F 5/00
(52) U.S. Cl. .............................. 267/64.16; 267/64.28; 280/124.16
(58) Field of Search ........................ 267/64.16, 64.28; 280/124.104, 124.106, 124.157, 124.158, 124.159, 124.16, 124.161, 5.514

(56) References Cited

U.S. PATENT DOCUMENTS

| 4,659,104 A | * | 4/1987 | Tanaka et al. ............ 280/6.158 |
| 4,809,957 A | * | 3/1989 | Schonfeld et al. ........ 267/64.11 |
| 4,834,418 A | * | 5/1989 | Buma et al. ........... 280/124.106 |
| 4,852,906 A | * | 8/1989 | Buma et al. ............. 280/5.507 |
| 4,856,798 A | * | 8/1989 | Buma et al. ............. 280/5.507 |
| 4,858,895 A | * | 8/1989 | Buma et al. ............. 267/64.16 |
| 4,965,878 A | * | 10/1990 | Yamagiwa et al. ........... 701/37 |
| 5,322,321 A | * | 6/1994 | Yopp ....................... 280/6.158 |
| 5,709,246 A | * | 1/1998 | Koelzer .................. 137/627.5 |
| 6,098,967 A | * | 8/2000 | Folchert .................. 267/64.16 |
| 6,116,586 A | * | 9/2000 | Westerkamp et al. .... 267/64.28 |
| 6,354,617 B1 | * | 3/2002 | Behmenburg et al. ..................... 280/124.157 |

OTHER PUBLICATIONS

U.S. patent application Ser. No. 09/733,046, Behmenburg et al., filed Dec. 11, 2000.

* cited by examiner

Primary Examiner—Robert A. Siconolfi
(74) Attorney, Agent, or Firm—Walter Ottesen

(57) ABSTRACT

A closed level control system includes an air dryer (10) which is mounted in a pressurized air line (4). The compressor output (16) can be connected to the pressurized air supply vessel (12) via the pressurized air line (4). Air from the atmosphere can be transferred via an intake valve (30) into the pressurized air supply vessel (12) via the compressor and the air dryer (10). Furthermore, pressurized air can be discharged into the atmosphere from the pressurized air supply vessel (12) via the air dryer (10) and the intake valve (30). There is a flow in the opposite direction through the air dryer than when filling the pressurized air supply vessel (12) from the atmosphere. In this way, an excellent regeneration of the air dryer (10) is ensured.

23 Claims, 9 Drawing Sheets

CLOSED LEVEL CONTROL SYSTEM FOR A VEHICLE

BACKGROUND OF THE INVENTION

A closed level control system for a vehicle is disclosed in U.S. Pat. No. 6,685,174, and incorporated herein by reference. The level control system known from this application includes an air dryer via which air can be drawn from the atmosphere by suction with the aid of the compressor and can be transferred into the pressurized medium supply vessel for leakage compensation. Pressurized air can be discharged from the pressurized medium supply vessel into the atmosphere via the air dryer to regenerate the latter. With the integration of the air dryer into the level control system, it is substantially ensured that dehumidified air is in the level control system so that the components of the level control system are protected from corrosion and icing. It has, however, been determined that in a level control system known from the above publication, the air dryer directly faces the atmosphere so that the air dryer continuously takes up atmospheric moisture from the atmosphere. Under some circumstances, this can lead to the situation that the air dryer does not fulfill its function or cannot fulfill its function adequately. This problem could be solved in that the air dryer is correspondingly dimensioned but this would lead to a complicated configuration and high costs of the air dryer.

SUMMARY OF THE INVENTION

It is an object of the invention to provide a closed level control system which includes an air dryer which is always available for air drying and furthermore has a simple configuration.

The closed level control system of the invention is for a vehicle having a vehicle body, vehicle axles and pressurized medium chambers with which the vehicle body is suspended relative to corresponding ones of the vehicle axles. The closed level control system includes: a pressurized medium supply vessel for holding a medium under pressure as a pressurized medium; a compressor for transferring the pressurized medium between the supply vessel and the pressurized medium chambers; the compressor having an input and an output; a first controllable directional valve switchable between a base position wherein no throughflow is permitted and a switched position wherein throughflow is permitted; a first pressurized air line connecting the supply vessel to the input of the compressor via the first controllable directional valve; a second controllable directional valve switchable between a base position wherein no throughflow is permitted and a switched position wherein throughflow is permitted; a second pressurized air line connecting the output of the compressor to the pressurized medium chambers via the second controllable directional valve; the pressurized medium being transmitted from the supply vessel to the pressurized medium chambers by the compressor when the first and second controllable directional valves are in the switched position; a third controllable directional valve switchable between a base position wherein no throughflow is permitted and a switched position wherein throughflow is permitted; a third pressurized air line connecting the input of the compressor to the pressurized medium chambers via the third controllable directional valve; a fourth controllable directional valve switchable between a base position wherein no throughflow is permitted and a switched position wherein throughflow is permitted; a fourth pressurized air line connecting the output of the compressor to the pressurized medium supply vessel via the fourth controllable directional valve; the pressurized medium being transmitted from each of the pressurized medium chambers to the supply vessel by the compressor when the third and fourth controllable directional valves are in the switched position; an air dryer mounted in the fourth pressurized air line; an intake valve switchable between a base position wherein no throughflow is permitted and a switched position wherein throughflow is permitted; an intake line ending at the intake valve and connecting the input of the compressor to the atmosphere when the intake valve is in the switched position; a discharge valve switchable between a base position wherein no throughflow is permitted and a switched position wherein throughflow is permitted; a discharge line branching off from the fourth pressurized air line at a branch point between the output of the compressor and the air dryer and ending at the discharge valve; and, the supply vessel being connectable to the atmosphere via the air dryer and the discharge line when the discharge valve is in the switched position.

An advantage of the invention is that the air dryer can be mounted in a pressurized air line of the level control system and is at least shielded completely from the atmosphere by the intake valve or by the discharge valve. In this way, the problem is avoided that the air dryer continuously takes up atmospheric moisture from the atmosphere. A further advantage of the invention is that the air dryer is mounted on the compressor output end (that is, on the pressure end of the compressor). This leads to an especially high effectiveness of the air dryer during drying operation. For this reason, the air dryer can have a simple configuration and a small-dimensioned dryer bed. A further advantage of the invention is that even though the air dryer is completely integrated into the closed level control system, pressurized air from the pressurized air supply vessel can be discharged via the air dryer (for its regeneration) into the atmosphere. A further advantage of the invention is that there is a flowthrough of the air dryer during regeneration operation in the opposite direction than during the drying operation. In this way, an excellent regeneration of the air dryer is ensured.

In the closed level control system of the invention, the first to fourth controllable directional valves are mounted in the first to fourth pressurized air lines, respectively; the first to fourth pressurized air lines are cleared in a first switching state of the first to fourth controllable directional valves and blocked in a second switching state of the first to fourth directional valves; the first and fourth pressurized air lines are connected together at a first point between the first and fourth controllable directional valves and the pressurized medium supply vessel and, from the first point, the first and fourth pressurized air lines are connected to the pressurized medium supply vessel via a first common pressurized air line; and, the second and third pressurized air lines are connected together at a second point between the second and third controllable directional valves and the pressurized medium chambers and, from the second point, the second and third pressurized air lines are connected to the pressurized medium chambers via a second common pressurized air line. The advantage of this embodiment is that only 2/2 directional valves are mounted in the four pressurized air lines which provide a simple configuration and are cost effective.

The closed level control system of the invention further comprises: the first and fourth controllable directional valves are combined to form a first composite directional valve; the second and third controllable directional valves are combined to form a second composite directional valve; each of the first and second composite controllable directional valves are switchable between first and second switching states; the first and second controllable composite directional valves can assume at least two switching states; the first pressurized air line is closed with the first controllable composite directional valve and the second pressurized air line is cleared with the second controllable composite directional valve; the fourth pressurized air line is blocked with the first controllable composite directional valve and the third pressurized air line is blocked with the second controllable composite directional valve when pressurized air is to be transferred from the pressurized medium chambers; and, the first and second controllable composite directional valves are a first switching state; the third pressurized air line is cleared with the second controllable composite directional valve and the fourth pressurized air line is cleared with the first controllable composite directional valve; and, the first pressurized air line is blocked with the first controllable composite directional valve and the second pressurized air line is blocked with the second controllable composite directional valve when pressurized air is to be transferred from the pressurized medium chambers to the pressurized medium supply vessel; and, the first and second controllable composite directional valves are in a second switching state. The advantage of this embodiment is that only two 3/2 directional valves are mounted in the four pressurized air lines which provide a simple configuration and are cost effective.

The closed level control system of the invention further includes: the first pressurized air line starting from the pressurized medium supply vessel and the third pressurized air line starting from the pressurized medium chambers are both terminated in a common third point connected directly to the input of the compressor.

In this embodiment, the first pressurized air line, which starts from the pressurized air vessel, and the third pressurized air line, which starts from the pressurized air chamber, end in a common point which is directly connected to the compressor input. The advantage of this embodiment is that, starting from the common point, the first pressurized air line and the third pressurized air line are led in a common pressurized air line to the compressor input and thereby the number of pressurized air lines needed is reduced.

The closed level control system of the invention further includes: a first check valve open to the input of the compressor; the first check valve is disposed in the first pressurized air line between the third point and the first controllable composite directional valve; a second check valve open to the input of the compressor; and, the second check valve is disposed in the third pressurized air line between the third point and the second controllable composite directional valve.

The advantage of this embodiment is that, in a specific position of the two 3/2 directional valves, an overflow of pressurized air from the pressurized air chambers into the pressurized air vessel is impossible and this is independent of whether the air pressure in the pressurized medium chambers is greater or less than the air pressure in the pressurized medium supply vessel. In the rest condition of the level control system, that is, when no control takes place, the controllable directional valves can, for example, be transferred into this position so that an unintended overflow of pressurized air between the pressurized medium chambers and the pressurized medium supply vessel cannot take place. Furthermore, with a defined state of this kind of the controllable directional valves, a pressure measurement of the pressure in the pressurized medium chambers is possible in a simple manner with the aid of a pressure sensor (in this connection, reference can be made to FIG. 2). The advantages achieved with this embodiment are attained while maintaining all functions of the level control system. It is furthermore especially possible to discharge pressurized air into the atmosphere from the pressurized medium supply vessel via the air dryer in order to regenerate the air dryer. For more information, reference can be made to the description of FIG. 2.

According to another feature of the invention, the level control system includes a further controllable directional valve which blocks the connection between the air springs and the compressor and air dryer but permits a connection between the air springs and the pressure sensor. An exchange of air and therefore a pressure compensation between the air dryer and/or compressor and the air springs (for example, for a pressure measurement in an air spring) can, when the pressure level of the air dryer or compressor and the particular air spring is different, lead to a pressure change in the particular air spring because of the volume of the air dryer or compressor. This generates a tilted position of the vehicle and therefore makes a readjustment of the vehicle level necessary. The advantage of this embodiment is that no air can escape into the air dryer or the compressor when there is a pressure measurement in an air spring (independent of the switching state of the two 3/2 directional valves) and therefore no pressure change can take place in the particular air spring because the additional controllable directional valve blocks this connection and therefore no inclined position of the vehicle is generated and no readjustment of the vehicle level is necessary after a pressure measurement.

According to another feature of the invention, the discharge line is connected to the intake line. A directional valve is mounted between the point at which the discharge line branches off from the fourth pressurized air line and the point at which the pressurized air line is connected to the intake line. This directional valve blocks the discharge line in a first switching state and clears the discharge line in a second switching state so that the intake valve can be simultaneously used as a discharge valve. The advantage of this further improvement of the first embodiment is that no separate intake valve need be made available.

According to another feature of the invention, the intake valve is disposed in a pressurized air line which branches from the second common pressurized air line. The advantage of this improvement is that the intake valve lies in direct proximity to those valves which are connected ahead of the individual pressurized medium chambers.

According to another embodiment of the invention, the discharge line between the point at which it branches from the fourth pressurized air line and the point at which it is connected to the intake line matches with the second pressurized air line. The advantage of this improvement is that the second pressurized air line can be used twice (once as a discharge line and once as a connecting piece of the pressurized medium supply vessel with the pressurized medium chambers) so that the length of the pressurized air lines in the level control system can be reduced.

The closed level control system of the invention further includes: the first and fourth controllable directional valves are combined to form a first composite directional valve; the second and third controllable directional valves are combined to form a second composite directional valve; each of the first and second composite controllable directional valves are switchable between first and second switching states; the first pressurized air line is cleared with the first composite directional valve and the second pressurized air line is cleared with the second composite directional valve when pressurized air is to be transferred from the pressurized medium supply vessel into the pressurized medium chambers with both of the composite directional valves being in the first switching states; and, the third pressurized air line is cleared with the first composite directional valve and the fourth pressurized air line is cleared with the second composite directional valve when pressurized air is to be transferred from the pressurized medium chambers into the pressurized medium supply vessel with both of the composite directional valves being in the second switching state.

According to another feature of the invention, a check valve, which is opening toward the air dryer, is mounted in the fourth pressurized air line between the air dryer and the pressurized medium supply vessel. The check valve is bridged by a pressurized air line in which a throttle is mounted. The advantage of this improvement is that the pressurized air is guided through the throttle during the transfer of pressurized air from the pressurized medium supply vessel via the air dryer into the atmosphere, so that the pressurized air is relaxed before entry into the air dryer. In this way, an especially good regeneration of the air dryer is ensured and only a small air quantity need be discharged in order to completely regenerate the air dryer. Nevertheless, it is ensured that pressurized air can be transferred rapidly from the pressurized medium chambers into the pressurized medium supply vessel so that a rapid drop of the vehicle body is possible. This is so because, in this case, the pressurized air is transferred starting from the air dryer via the check valve into the pressurized medium supply vessel.

According to another improvement of the invention, the level control system includes a pressure sensor which is mounted in a pressurized air line starting from the pressurized medium chambers. A controllable directional valve is disposed between each pressurized medium chamber and the pressure sensor. In a first switching state, the directional valve separates the pressurized medium chambers from the pressure sensor and, in a second switching state, the pressurized medium chamber is connected to the pressure sensor. The advantage of this improvement is that the pressure in the pressurized medium chambers can be measured in a simple manner with the pressure sensor. Furthermore, it is likewise possible to measure the pressure in the pressurized medium supply vessel with the aid of the pressure sensor.

In the level control systems of the type initially mentioned herein, it is further the requirement that the control operations be carried out as rapidly as possible. This concerns not only control operations during travel but also those at standstill of the vehicle or where travel is at a low speed. Often, great differences in elevation must be mastered. Accordingly, for a relatively high built vehicle (such as the so-called sports utility vehicles), the desire is present to lower the vehicle when stopping in order to facilitate a comfortable exiting and entering of the driver and passenger and to raise the vehicle to an optimal travel height again when again starting travel. In conventional level control systems, it takes a relatively long time until the air is withdrawn from all pressurized medium chambers so that the passengers are compelled to wait after stopping the vehicle before they can comfortably exit therefrom. Closed level control systems are here already at an advantage compared to open systems wherein the air can flow off only slowly via the air dryer.

According to a further feature of the invention, the level control system is equipped with several compressors. Each compressor is itself connected to the pressurized medium supply vessel in the manner described above and to specific pressurized medium chambers. In this way, a single compressor is no longer responsible for the entire system with all pressurized medium chambers; instead, an individual compressor only has to supply a portion of the pressurized medium chambers and, in the extreme case, even only a single pressurized medium chamber. Several compressors can simultaneously supply air to the pressurized medium chambers or air can be withdrawn from the pressurized medium chambers. In a parallel operation of this kind, these operations can take place much faster than in conventional level control systems wherein all the air is guided via a single compressor. The improvement of the invention in accordance with this embodiment therefore has the advantage that one can introduce a level change of the vehicle more rapidly than with a conventional level control system. This improvement of the invention has the further advantage that air is supplied to a portion of the pressurized medium chambers and, at the same time, air can be withdrawn from other pressurized medium chambers and air can be exchanged between individual pressurized medium chambers or groups of pressurized medium chambers. Compared to the system of the first embodiments (which make possible an individual driving of the individual air springs but only either in the operation of "filling" or in the operation of "discharge", but not in both modes of operation simultaneously), there results in this way the advantage of expanded control possibilities. With this system, excellent possibilities are provided to carry out further programs for controlling (open loop and/or closed loop) the body of the vehicle which go beyond the control of the level.

According to another embodiment, a compressor is allocated to the pressurized medium chambers of each axle. This embodiment has the advantage that rapid pressure changes can be achieved with little complexity. For a vehicle having two axles, a doubling of the speed for level changes compared to conventional systems are achieved with only one compressor. According to a further embodiment, a compressor is assigned even to the pressurized medium chambers of each wheel of the vehicle. This embodiment has the advantage that still more rapid reactions are possible and that, in addition, individual controls for each wheel can be undertaken completely independently of the other pressurized medium chambers.

According to another improvement of the invention, only one air dryer as well as one intake line and one discharge line with corresponding valves are provided for the entire level control system. This embodiment has the advantage that the structural complexity is held low. This is based on the recognition that an air exchange with the ambient takes place to only a small extent for a closed level control system and that all components of the system are connected to each other via the pressurized medium supply vessel.

According to another embodiment of the invention, the pressurized medium chambers of the individual vehicle axles are assigned their own intermediate stores for the pressurized medium. When dropping the vehicle, these intermediate stores can take up a large quantity of air from the pressurized medium chambers in a short time whereby a rapid lowering of the vehicle is possible. From the intermediate stores, the air can be moved via the compressor into the pressurized medium supply vessel. This transport of the air can take place slowly without the lowering of the vehicle being slowed. In the system, the discharge of the pressurized medium chambers for lowering the level of the vehicle is decoupled from the flow of the pressurized medium into the remaining parts of the system (to which the compressor, the valves and relatively long line systems belong). A rapid discharge of the pressurized medium chambers is possible without it being necessary to design the entire system for a rapid displacement of large quantities of air. Compared to the alternative embodiments, this embodiment has the advantage that only a single compressor is required.

Preferably, the output lines of the intermediate stores are provided with check valves which permit an unimpeded discharge of the pressurized medium from the intermediate stores but prevent an inflow of the air from the system. In this way, it is achieved that the pressure in the intermediate stores is always less than in the pressurized medium chambers.

According to a further embodiment of the invention, the individual pressurized medium chambers are assigned respective directional valves. These valves are connected to respective pressurized medium lines leading to the input of the compressor. With these valves, a control to compensate for pitch and roll movements of the vehicle is made possible as explained hereinafter.

According to another improvement of the invention, a line is provided which serves to connect external apparatus. This line is connected to the pressurized medium lines. This further embodiment of the invention affords the advantage that the pressurized air in the system can be utilized for additional apparatus. In an advantageous manner, the line for connecting to external apparatus is equipped with a lock. The lock is only opened when an external apparatus is connected to the line. Preferably, the line leading to the outside functions for connecting a tire filling device.

According to a further feature, the line, which serves for connecting, is connected directly to the compressor output. This embodiment affords the advantage that air, which is drawn by suction from the ambient when pumped to the external connection by the compressor, does not flow through the air dryer and the air dryer is therefore not subjected to unnecessary loading.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
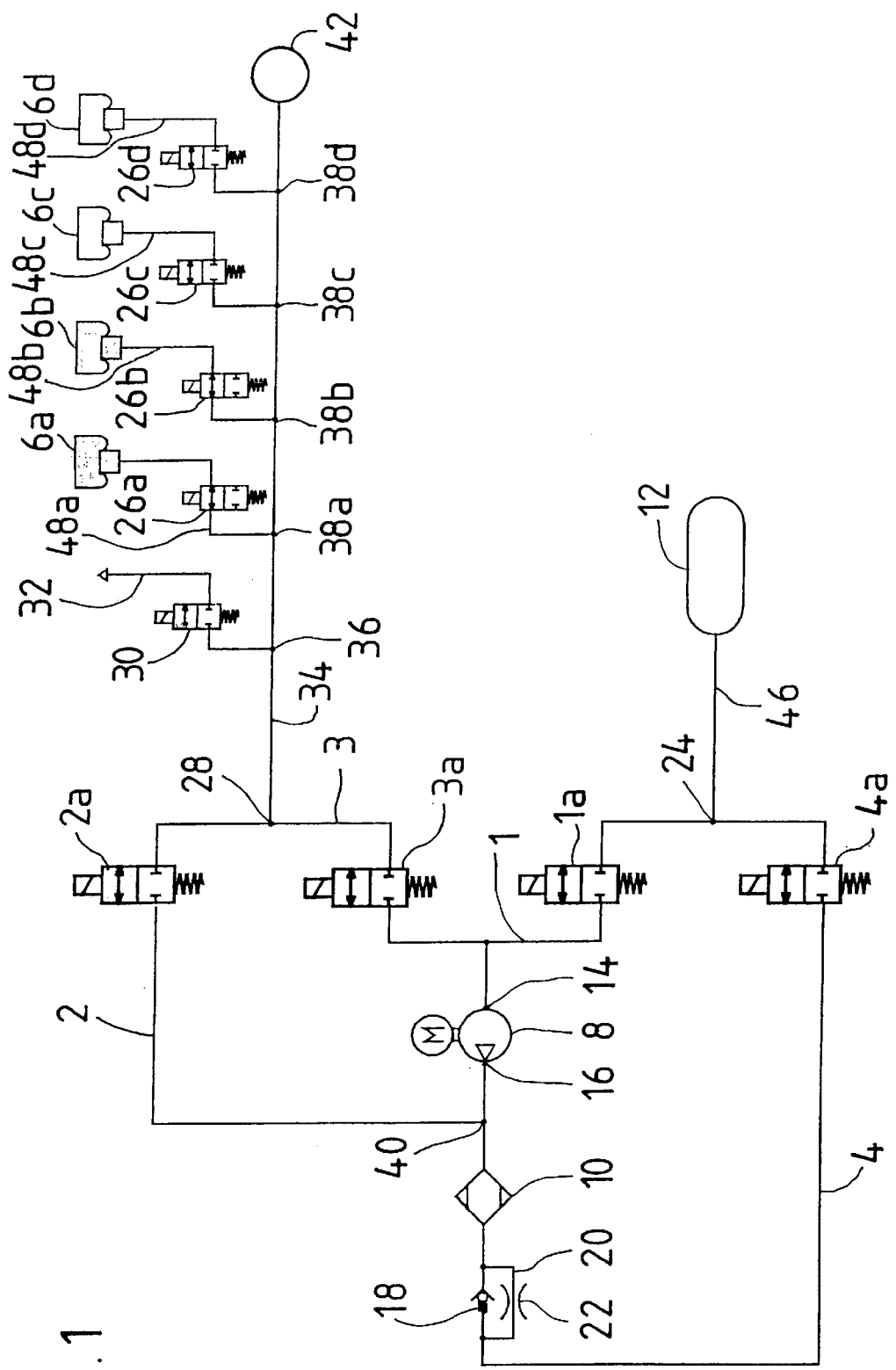
FIG. 1 is a schematic of a first embodiment of the level control system according to the invention.

A level control system is shown schematically in FIG. 1 and includes: the pressurized medium chambers in the form of air springs 6a to 6d, a compressor 8, an air dryer 10 and a pressurized air supply vessel 12. The pressurized air supply vessel 12 is connected to the compressor input 14 via a first pressurized air line 1, which is led through a first directional valve 1a, and is connected to the compressor output 16 via a fourth pressurized air line 4 in which a controllable 2/2 directional valve 4a and an air dryer 10 lie. A check valve 18 is mounted in the fourth pressurized air line 4 between the air dryer 10 and the pressurized air supply vessel 12. The check valve 18 opens toward the pressurized air supply vessel 12 and is bridged by a pressurized air line 20 wherein a throttle 22 is mounted. The first pressurized air line 1 and the fourth pressurized air line 4 are connected together at point 24 which lies between the controllable 2/2 directional valves 1a and 4a and the pressurized air supply vessel 12. Starting from this point 24, the pressurized air lines 1 and 4 are led in a common pressurized air line 46 to the pressurized air supply vessel 12.

The compressor output 16 is connectable to each of the air springs 6a to 6d via a second pressurized air line 2. The pressurized air line 2 leads to air springs 6a to 6d via a controllable directional valve 2a and controllable directional valves 26a to 26d assigned to corresponding ones of the air springs 6a to 6d. Furthermore, the compressor input 14 can likewise be connected to each of the air springs 6a to 6d via a third pressurized air line 3 which is led through a controllable directional valve 3a and the controllable directional valves 26a to 26d. The second pressurized air line 2 and the third pressurized air line 3 are connected to each other at point 28 which lies between the directional valves 2a and 3a and the air springs 6a to 6d. Starting from point 28, the pressurized air lines 2 and 3 are led to the air springs 6a to 6d via a common pressurized air line 34 and via individual pressurized air lines 48a to 48d. The individual pressurized air lines 48a to 48d branch away from the common pressurized air line 34 at points 38a to 38d, respectively, and the directional valves 26a to 26d lie in the air pressure lines 48a to 48d, respectively.

The 2/2 directional valves 1a to 4a can be combined into a first valve block and the directional valves 26a to 26d and the intake valve 30 can be combined into a second valve block. The function of the intake valve 30 will be explained hereinafter.

In the following, it will be explained how the air springs 6a to 6d can be filled from the pressurized air supply vessel 12 via the compressor 8 in the level control system. This will be illustrated with respect to air spring 6a. First, the directional valves 1a, 2a and 26a are controlled by a control unit (not shown) so that these valves pass into the second switching state from the first switching state shown in FIG. 1. The pressurized air line 1 is then cleared so that the pressurized air supply vessel 12 is connected to the compressor input 14. Furthermore, the pressurized air line 2 is cleared so that the compressor output 16 is connected to the air spring 6a. In this way, pressurized air can be transferred from the pressurized air supply vessel 12 into the air spring 6a via the directional valve 1a, the compressor 8, the directional valve 2a and the directional valve 26a. The control unit further controls the compressor 8 so that the compressor starts to run and the air spring 6a is filled. Should the filling operation be interrupted, then the directional valves 1a, 2a and 26a are no longer supplied with current by the control unit so that these valves return to their first switching state. Furthermore, the compressor 8 is no longer driven so that it no longer runs.

In the following, it is explained how pressurized air is transferred into the pressurized air supply vessel 12 from the air springs 6a to 6d via the compressor 8. This is shown by way of the example with respect to air spring 6a. First, the directional valves 26a, 3a and 4a are driven by the control unit of the level control system so that these valves transfer from the first switching state shown in FIG. 1 into the second switching state. In this case, the air spring 6a is connected to the compressor input 14 via the pressurized air line 3. Furthermore, the compressor output 16 is connected via the pressurized air line 4 to the pressurized air supply vessel 12. The air spring 6a can then be discharged into the pressurized air supply vessel 12 via the directional valve 26a, the directional valve 3a, the compressor 8, the air dryer 10, the check valve 18 and the directional valve 4a. During discharge, the compressor 8 is driven by the control unit of the level control system so that the compressor starts to run and supports the discharge operation. To end the discharge operation, the directional valves 26a, 3a and 4a are no longer supplied with current by the control unit so that these valves return to the first switching state. Furthermore, the compressor 8 is no longer driven so that it stops running.

The compressor 8 pumps exclusively pressurized air from the compressor input 14 to the compressor output 16 during filling as well as during discharge of the air springs 6a to 6d so that only one compressor is needed which can pump pressurized air only in one direction. The same applies to the embodiment described below.

In addition to the above-mentioned components, the level control system includes an intake valve 30. The intake valve 30 lies in a pressurized air line via which the compressor input 14 can be connected to the atmosphere. Preferably, the intake valve 30 is mounted in the pressurized air line 32 which branches from the pressurized air line 34 at point 36 which lies between point 28 and the branches 38a to 38d to the respective air springs 6a to 6d. With the intake valve 30, pressurized air from the atmosphere can be transferred via the compressor 8 into the pressurized air supply vessel 12 as will now be explained. First, the intake valve 30, the controllable directional valve 3a and the controllable directional valve 4a are driven by the control unit of the level control system so that these valves transfer from the base state shown in FIG. 1 into their switching states. Furthermore, the compressor 8 is so controlled by the control unit that it starts to run. Starting from the pressurized air line 32, pressurized air from the atmosphere is transferred into the pressurized air supply vessel 12 via the intake valve 30, the controllable directional valve 3a, the compressor 8, the air dryer 10, the check valve 18 and the controllable directional valve 4a. In the air dryer 10, the pressurized air is dried and the flow through the air dryer is in a first direction from right to left in FIG. 1.

During the intake operation, it is necessary that the air springs 6a to 6d are not connected to the atmosphere and that the compressor output 16 not be connected to the atmosphere. This is so because the compressor 8 would otherwise pump the air, which is inducted from the atmosphere via the compressor input 14, back into the atmosphere. The air springs 6a to 6d are prevented from being connected to the atmosphere by the controllable directional valves 26a to 26d, respectively, and the compressor output 16 is prevented from being connected to the atmosphere by the controllable directional valve 2a which, during induction, is in the switching state shown in FIG. 1.

The level control system includes a pressurized air line which branches off from the fourth pressurized air line 4 at point 40 which is disposed between the compressor output 16 and the air dryer 10. The pressurized air supply vessel 12 can be connected to the atmosphere via the pressurized air line 4 via the air dryer 10 and via a discharge valve. In the embodiment shown, this pressurized air line is formed, starting from point 40, by a pressurized air line 2 and, starting from point 36, by pressurized air line 32. The pressurized air line 2 is formed between points 28 and 36 by the pressurized air line 34. The intake valve 30 is used as a discharge valve in the embodiment shown. A discharge of pressurized air from the pressurized air supply vessel 12 takes place as will now be described. First, the controllable directional valve 4a, the controllable directional valve 2a and the intake valve 30 are driven by the control unit of the level control system so that they transfer from the base state, which is shown in FIG. 1, to their switched state. The pressurized air supply vessel 12 is then connected to the atmosphere via the controllable directional valve 4a, the throttle 22, the air dryer 10, the controllable directional valve 2a and the intake valve 30 so that the vessel 12 can be discharged into the atmosphere. During the discharge operation, the flowthrough through the air dryer 10 is in the opposite direction (from left to right in FIG. 1) as during filling from the atmosphere so that the air dryer can regenerate especially effectively.

The air springs 6a to 6d must be separated from the atmosphere by controllable directional valves during the discharge operation so that these air springs are not inadvertently discharged. In the embodiment shown, this takes place via the controllable directional valves 26a to 26d. To end the discharge operation, the directional valves 4a, 2a and 30 are no longer supplied with current by the control unit so that they again transfer back into their base state.

Finally, the level control system includes a pressure sensor 42 in the pressurized air line 34 with which the pressure in the air springs 6a to 6d can be measured as will now be explained with respect to air spring 6a. First, the directional valve 26a is driven by the control unit of the level control system so that this valve transfers from the base state shown in FIG. 1 into its switched state. The air spring 6a is then connected to the pressure sensor 42 so that the corresponding pressure can be measured there and can be transmitted to the control unit of the level control system. With the aid of this pressure sensor 42, the pressure in the pressurized air supply vessel 12 can likewise be measured in that the controllable directional valves 1a and 3a are driven by the control unit so that they transfer from the base state shown in FIG. 1 into their switched state. The pressurized air supply vessel 12 is then connected to the pressure sensor 42 via the controllable directional valves 1a and 3a and via the pressurized air line 34 so that the corresponding pressure can be measured and transmitted to the control unit.

Figure 2:
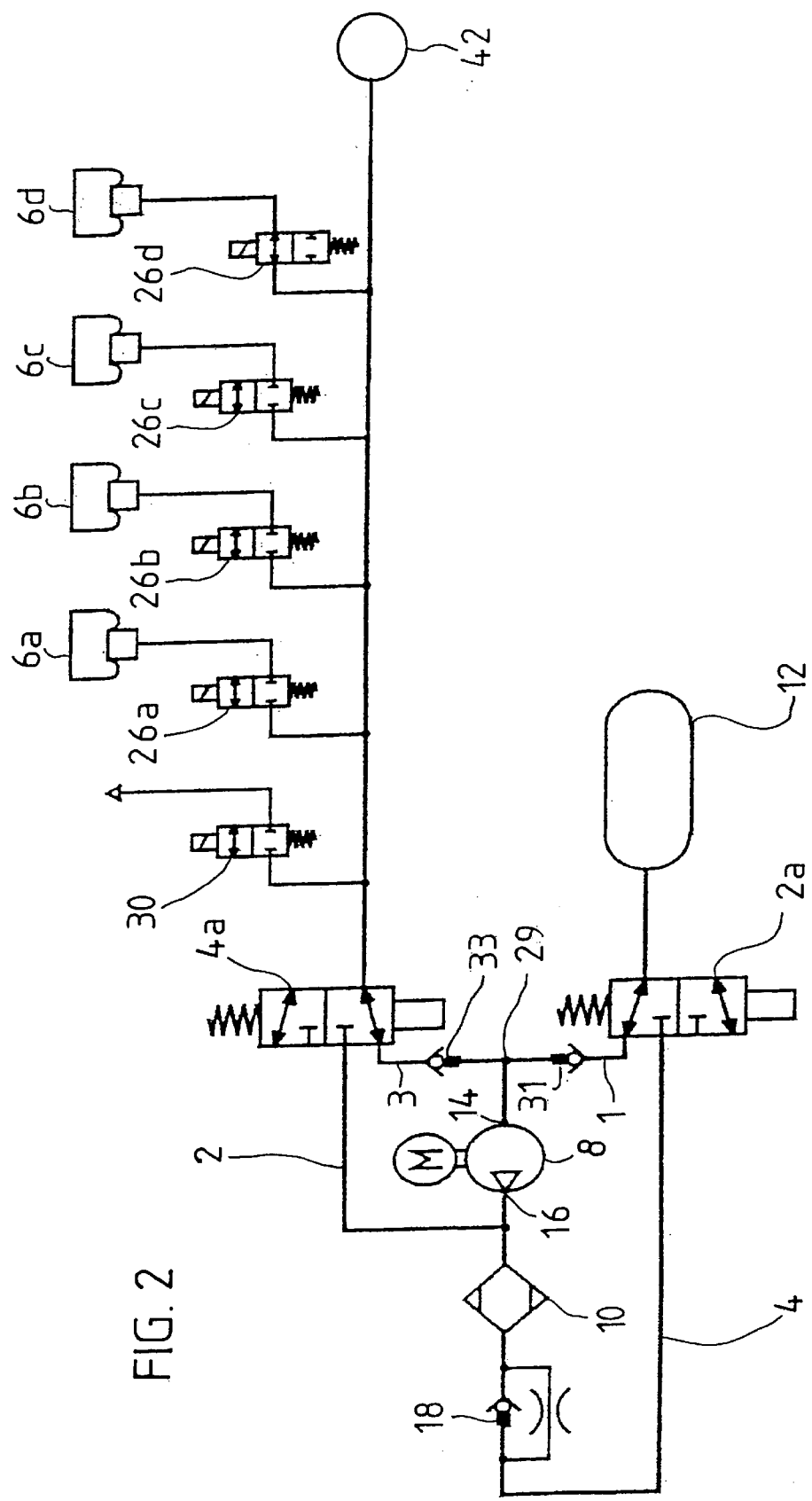
FIG. 2 is a schematic of a second embodiment of the level control system of the invention incorporating a modification of the directional valve.

FIG. 2 shows a level control system which corresponds substantially to the level control system shown in FIG. 1. In the level control system of FIG. 2, the controllable directional valve 1a and 4a shown in FIG. 1 are combined into the controllable 3/2 directional valve 2a and the directional valves 2a and 3a, which are shown in FIG. 1, are combined into the controllable 3/2 directional valve 4a. Starting from the pressurized air supply vessel 12, the pressurized air line 1 is led via the controllable directional valve 2a to a point 29. Starting from the air springs 6a to 6d, the pressurized air line 3 is led via the controllable directional valve 4a likewise to the point 29 so that the pressurized air line 1 and the pressurized air line 3 are connected to each other at this common point 29. The common point 29 of the pressurized air lines 1 and 3 (if required, via a short pressurized air line as also shown in FIG. 2) is connected directly to the compressor input 14. In the first pressurized air line 1, a check valve 31 is mounted between the common point 29 and the controllable directional valve 2a and this check valve 31 is open toward common point 29 and the compressor input 14. A check valve 33 is likewise arranged in the pressurized air line 3 between the common point 29 and the controllable directional valve 4a. The check valve 33 is open toward the common point 29 and the compressor input 14.

The functions of the level control system of FIG. 2 will be explained in the following. To transfer pressurized air from the air spring 6a, the controllable directional valves 26a and 2a are first transferred from the switched state shown in FIG. 2 into the other switched state. The air spring 6a is then connected to the compressor input 14 via the pressurized air line 3 in which the cleared directional valves 26a and 4a and the check valve 33 lie. The compressor output 16 is connected via the pressurized air line 4 in which the air dryer 10, the check valve 18 and the cleared directional valve 2a lie. Accordingly, and starting from the air spring 6a, the air can be transferred with the aid of the compressor 8 into the pressurized air supply vessel 12 (see FIG. 1). During this operation, the pressurized air line 2 is blocked, by the controllable valve 4a and the pressurized air line 1 is blocked by the controllable directional valve 2a. To end the operation, at least the controllable directional valve 26a is transferred again into the switched state shown in FIG. 2. The same procedure is followed for air springs 6b to 6d except that the controllable directional valves 26b to 26d assume corresponding switched positions.

The controllable directional valves 4a and 26a are transferred from the switched state shown in FIG. 2 into the other switched state in order to transfer pressurized air from the pressurized air supply vessel 12 into the air spring 6a. The pressurized air supply vessel 12 is then connected to the compressor input 14 via the pressurized air line 1 in which the cleared controllable directional valve 2a and the check valve 31 are mounted. The compressor output 16 is connected to the air spring 6a via the pressurized air line 2 in which the cleared controllable directional valve 4a and the controllable directional valve 26a are mounted. Accordingly, pressurized air can be transferred from the pressurized air supply vessel 12 into the air spring 6a via the compressor 8. During this operation, the pressurized air line 3 is blocked by the controllable directional valve 4a and the pressurized air line 4 is blocked by the controllable directional valve 2a. To end the operation, at least the controllable directional valve 26a is again transferred into the switched state shown in FIG. 2. The air springs 6b to 6d are filled in a corresponding manner with pressurized air from the pressurized air supply vessel 12.

To fill the pressurized air supply vessel 12 with air from the atmosphere, the controllable directional valves 30 and 2a are first transferred from the switched state shown in FIG. 2 into the other switched state. The atmosphere is then connected to the compressor input 14 via the controllable directional valve 30, the controllable directional valve 4a and the check valve 33. The compressor output 16 is connected to the pressurized air supply vessel 12 via the pressurized air line 4 in which the air dryer 10, the check valve 18 and the cleared controllable directional valve 2a are mounted so that a filling of the pressurized air supply vessel 12 is possible with air from the atmosphere with the aid of the compressor 8. During this operation, the pressurized air line 2 is blocked by the controllable directional valve 4a and the pressurized air line 1 is blocked by the controllable directional valve 2a. To end the operation, at least the controllable directional valve 30 is again transferred into the switched state shown in FIG. 2.

For discharging pressurized air from the pressurized air supply vessel 12 into the atmosphere, the controllable directional valves 2a, 4a and 30 are transferred from the switched state shown in FIG. 2 into the other switched state. The pressurized air supply vessel 12 is then connected to the atmosphere via the controllable directional valve 2a, the throttle 22, the air dryer 10, the controllable directional valve 4a and the controllable directional valve 30 so that pressurized air from the pressurized air supply vessel 12 can flow into the atmosphere. The pressurized air is conducted through the air dryer 10 so that the air dryer can be regenerated.

The above embodiments show that the functions of the level control system described above are not affected by the check valves 31 and 33. These functions include: transferring the pressurized air from the air springs 6a to 6d into the pressurized air supply vessel 12; transferring pressurized air from the pressurized air supply vessel 12 into the air springs 6a to 6d; filling the pressurized air supply vessel 12 with air from the atmosphere; and, discharging pressurized air from the pressurized air supply vessel 12 via the air dryer 10 into the atmosphere.

In the following, it is explained how, with the aid of the pressure sensor 42, the air pressure in the air springs 6a to 6d can be measured. During the pressure measurement, an air exchange between the air springs 6a to 6d and the air spring supply vessel 12 should be avoided in order to prevent an unintended lowering or raising of the vehicle body. Accordingly, the situation is to be avoided that, during the pressure measurement, pressurized air flows out from the air springs 6a to 6d into the pressurized air supply vessel (this could happen when the pressurized air in the air springs 6a to 6d, which are to be measured, is greater than the air pressure in the pressurized air supply vessel 12). The situation is likewise to be avoided that, during the pressure measurement, pressurized air flows out from the pressurized air supply vessel 12 into the air springs 6a to 6d whose air pressure is to be measured (this could happen when the pressurized air in the air springs 6a to 6d, which is to be measured, is less than in the pressurized air supply vessel 12). It is not known before the pressure measurement whether the air pressure in the air springs 6a to 6d, which are to be measured, is greater or less than in the pressurized air supply vessel 12. For this reason, a position of the controllable directional valves must be set with which both possible cases can be effectively suppressed independently of the pressure conditions. This is ensured by the position of the controllable directional valves 2a and 4a shown in FIG. 2 as will be explained below. The controllable directional valve 2a clears the pressurized air line 1 and blocks the pressurized air line 4 and the controllable directional valve 4a clears the pressurized air line 3 and blocks the pressurized air line 2.

In the following, the pressure measurement in one of the air springs 6a to 6d is explained by way of example with respect to air spring 6a. For measuring the air pressure, the controllable directional valve 26a is transferred from the switched position shown in FIG. 2 into the other switched position so that the air spring 6a is connected to the pressure sensor 42 via the controllable directional valve 26a and, with the aid of the pressure sensor, the air pressure can be measured. When the air pressure in the air spring 6a is greater than the air pressure in the pressurized air supply vessel 12, then, notwithstanding, no pressurized air can flow from the air spring 6a into the pressurized air supply vessel 12. The air from the air spring 6a reaches the check valve 31 via the controllable directional valves 26a and 4a and the check valve 33. However, the check valve 31 blocks toward the controllable directional valve 2a. In this way, the pressurized air reaches only to the check valve 31 but not to the controllable directional valve 2a and the pressurized air supply vessel 12. An overflow of pressurized air from the air spring 6a into the pressurized air supply vessel 12 via another path is likewise not possible because the pressurized air lines 2 and 4 are interrupted by the controllable directional valves 4a and 2a.

If, in contrast, the pressurized air in the pressurized air supply vessel 12 is greater than the air pressure in the air spring 6a, then it is likewise not possible that the pressurized air flows over from the vessel 12 into the air spring 6a. In this case, the air can only move to the check valve 33 starting from the pressurized air supply vessel 12 via the controllable directional valve 2a and the check valve 31. The check valve 33 blocks toward the controllable directional valve 4a and the air spring 6a. An overflow of pressurized air from the pressurized air supply vessel 12 into the air spring 6a via another path is likewise not possible because the pressurized air line 4 is interrupted by the directional valve 2a and the pressurized air line 2 is interrupted by the directional valve 4a.

For ending the pressure measurement, the controllable directional valve 26a is again transferred into the state shown in FIG. 1. The air pressure is measured in the air springs 6b to 6d in a corresponding way. In this case, the corresponding directional valves 26b to 26d are transferred from the switched state shown in FIG. 2 into another switched state.

Figure 3:
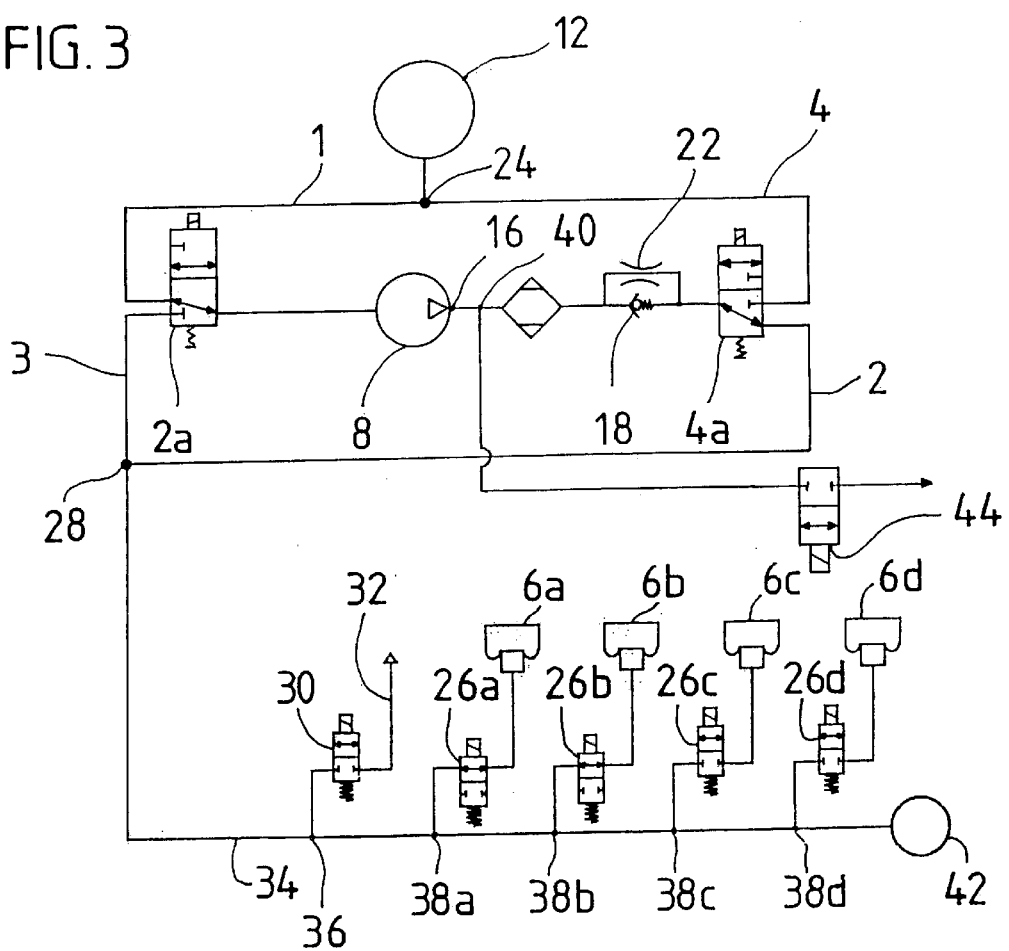
FIG. 3 is a schematic of a level control system which corresponds substantially to that shown in FIG. 1, but differs with respect to the directional valves.

FIG. 3 shows a level control system which corresponds substantially to the system shown in FIG. 1. A difference is that the directional valves 1a to 4a, which are shown switched as in FIG. 1, are combined into two controllable directional valves 2a and 4a. The level control system shown in FIG. 2 corresponds, with respect to its general configuration, to the level control system shown in U.S. Pat. 6,685,174, and incorporated by reference. Accordingly, reference is made to this application with respect to the filling of the air springs 6a to 6d from the air spring supply vessel 12 and the transfer of pressurized air from the air springs 6a to 6d into the pressurized air supply vessel 12. The level control system includes an air dryer 10 which is mounted in the fourth pressurized air line 4. The compressor output 16 can be connected via the fourth pressurized air line 4 to the pressurized air supply vessel 12 via the directional valve 4a. The connection can then be established when the directional valve 4a transfers from the switched state shown in FIG. 3 into its other switched state.

The level control system of FIG. 3 is configured in the same way as the level control system of FIG. 1 starting from the point 28 in the direction toward the air springs 6a to 6d so that the description of FIG. 1 can be referred to with respect thereto. Pressurized air can be transferred via the intake valve 30 from the atmosphere by the compressor 8 into the pressurized air supply vessel 12 as will now be explained. First, the valve 30, the directional valve 2a and the directional valve 4a are driven by the control unit (not shown) of the level control system so that they transfer from the switched state shown in FIG. 3 into their other switched state. Thereafter, the compressor 8 is driven by the control unit so that pressurized air is transferred from the atmosphere into the pressurized air supply vessel 12 via the intake valve 30, the directional valve 2a, the compressor 8, the air dryer 10, the check valve 18 and the directional valve 4a. For ending this operation, the compressor 8 is again driven by the control unit so that it stops running and, furthermore, the intake valve 30 is no longer supplied with current so that this valve again transfers into the position shown in FIG. 3 and blocks with respect to the atmosphere.

Pressurized air can be discharged from the pressurized air supply vessel 12 into the atmosphere via the discharge valve 44 for regenerating the air dryer 10. For this purpose, the level control system includes a pressurized air line which branches off from the fourth pressurized air line 4 at point 40. Point 40 lies between the compressor output 16 and the air dryer 10 and this pressurized air line (which branches off from point 40) can be connected to the atmosphere via a discharge valve 44. Discharging the pressurized air supply vessel 12 will now be described. The valves 44 and 4a are so driven by the control unit of the level control system that they transfer from the switched state shown in FIG. 3 into their other switched state. The pressurized air supply vessel 12 is then connected to the atmosphere via the directional valve 4a, the pressurized air line having the throttle 22, the air dryer 10 and the discharge valve 44. For ending the discharge operation, at least the valve 44 is no longer supplied with current by the control unit so that this valve transfers again into the switched state shown in FIG. 3 and is blocked to the atmosphere. During the discharge operation, there is a flowthrough through the air dryer in the direction opposite to that during the filling operation of the pressurized air supply vessel.

In FIGS. 4 to 8, embodiments of the invention are shown with which additional functions of the level control system are possible. The basis is always, however, systems as they were explained in connection with FIGS. 1 to 3. In the embodiments of FIGS. 4 to 8, level control systems are shown which are configured similarly to that described with respect to FIG. 1. These additional embodiments of the invention can, however, be configured in the manner of the level control systems of FIGS. 2 and 3. In FIGS. 4 to 8, the same reference numerals are retained for components which have not been changed relative to FIG. 1.

Figure 4:
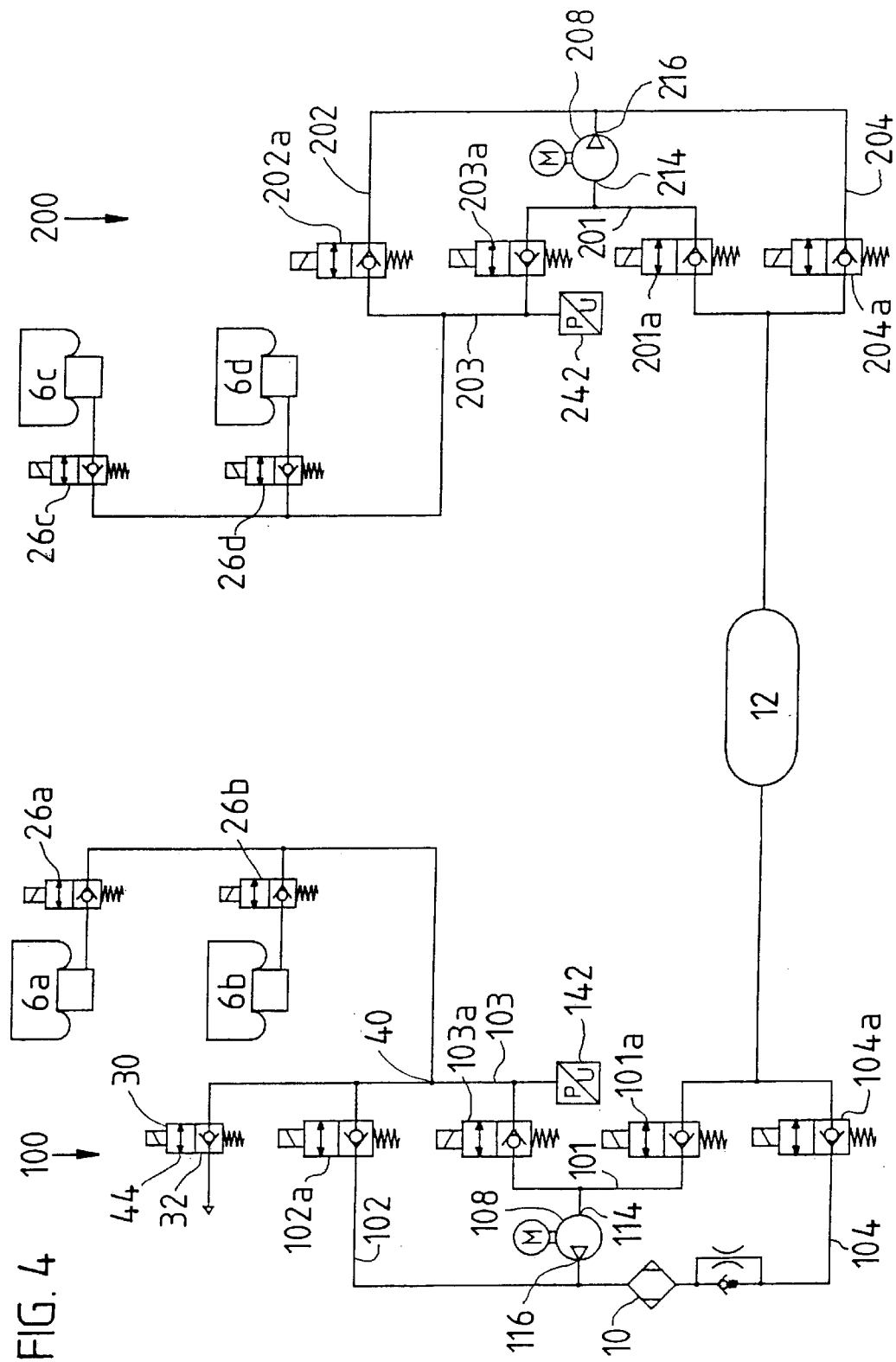
FIGS. 4 to 8 are schematics of additional embodiments of the level control system wherein additional functions of the control system are realized; and, FIG. 9 is a schematic of another embodiment of the level control system of the invention which corresponds substantially to the embodiment shown in FIG. 2 but wherein a further controllable directional valve is provided in the pressure control line.

FIG. 4 shows two control loops 100 and 200 which are configured in the same way as in FIG. 1. The control loops 100 and 200 are supplied from a single pressurized medium supply vessel 12. The pressurized medium chambers (in this example, 6a and 6b), which belong to the forward axle of the vehicle, are supplied and controlled by one of the control loops, for example, control loop 100 and the pressurized medium chambers (in this example, 6c and 6d) are supplied with air and controlled by the other control loop (in this example, control loop 200).

Control loop 100 has compressor 108 whose input 114 is connected to the pressurized medium supply vessel 12 via directional valve 101a and pressurized air line 101 and control loop 100 is connected to the pressurized medium chambers 6a and 6b of one vehicle axle via directional valve 103a and pressurized air line 103. Control loop 200 has compressor 208 whose input 214 is connected to the pressurized medium supply vessel 12 via directional valve 201a and pressurized air line 201 and control loop 200 is connected to the pressurized medium chambers 6c and 6d of the other vehicle axle via directional valve 203a and pressurized air line 203. The output 116 of compressor 108 is connected to the pressurized medium chambers (6a, 6b) via pressurized air line 102 and directional valve 102a and the output 216 of compressor 208 is connected to the pressurized medium chambers (6c, 6d) via pressurized air line 202 and directional valve 202a. The output 206 of compressor 208 is connected to the pressurized medium chambers (6c, 6d) via pressurized air line 202 and directional valve 202a. Also, the output 116 of compressor 108 is connected to the pressurized medium supply vessel 12 via pressurized air line 102 and directional valve 102a and output 216 of compressor 208 is connected to the pressurized medium supply vessel 12 via pressurized air line 204 and directional valve 204a. The control loops 100 and 200 are equipped with respective pressure sensors 142 and 242.

An air dryer 10 is mounted in the pressurized air line 104 of the control loop 100 and a throttle 22 and a check valve 18 in parallel to the latter are connected ahead of the air dryer 10. Air from the ambient can be taken up via line 32 or discharged to the ambient via this line. Line 32 is provided with valve 30. The operation of this arrangement is the same as in FIG. 1. These arrangements are only provided in control loop 100 but not in control loop 200. This is possible because, on the one hand, the control loops 100 and 200 are connected to each other via the pressurized medium supply vessel 12 and, on the other hand, because, for a closed level control system, an exchange with the ambient takes place only to a limited extent primarily for compensating for leakage losses.

The system of FIG. 4 is a doubling of the system of FIG. 1 except for the components used in common for air exchange with the ambient and the commonly used pressurized medium supply vessel 12. This increased complexity has, however, the advantage that each axle of a two-axle vehicle has available its own unit for air supply and pressure control of the pressurized medium chambers and each unit has its own compressor. Each compressor (108, 208) has therefore only two pressurized medium chambers to supply instead of four as in the system of FIG. 1. The two compressors (108, 208) are operated simultaneously and therefore the filling and discharging of the pressurized medium chamber takes place at twice the speed in a system of FIG. 4 than in a system of FIG. 1. Furthermore, the possibility is presented in a level control system of FIG. 4 that the pressurized medium chambers of the one axle can be filled and, at the same time, the pressurized medium chambers of the other axle can be discharged. With such a shift of the pressurized medium between the two axles, pitch movements of the vehicle can be compensated. The level control of FIG. 4 therefore affords the possibility to realize additional programs for vehicle body control without additional technical complexity such as devices, valves and the like provided especially for that purpose.

FIG. 4 shows a level control system for a vehicle having two axles. It is understood that, for a vehicle having more than two axles, additional like control loops can be connected in parallel with the control loops 100 and 200 so that each axle has its own control loop with a compressor.

Figure 5:
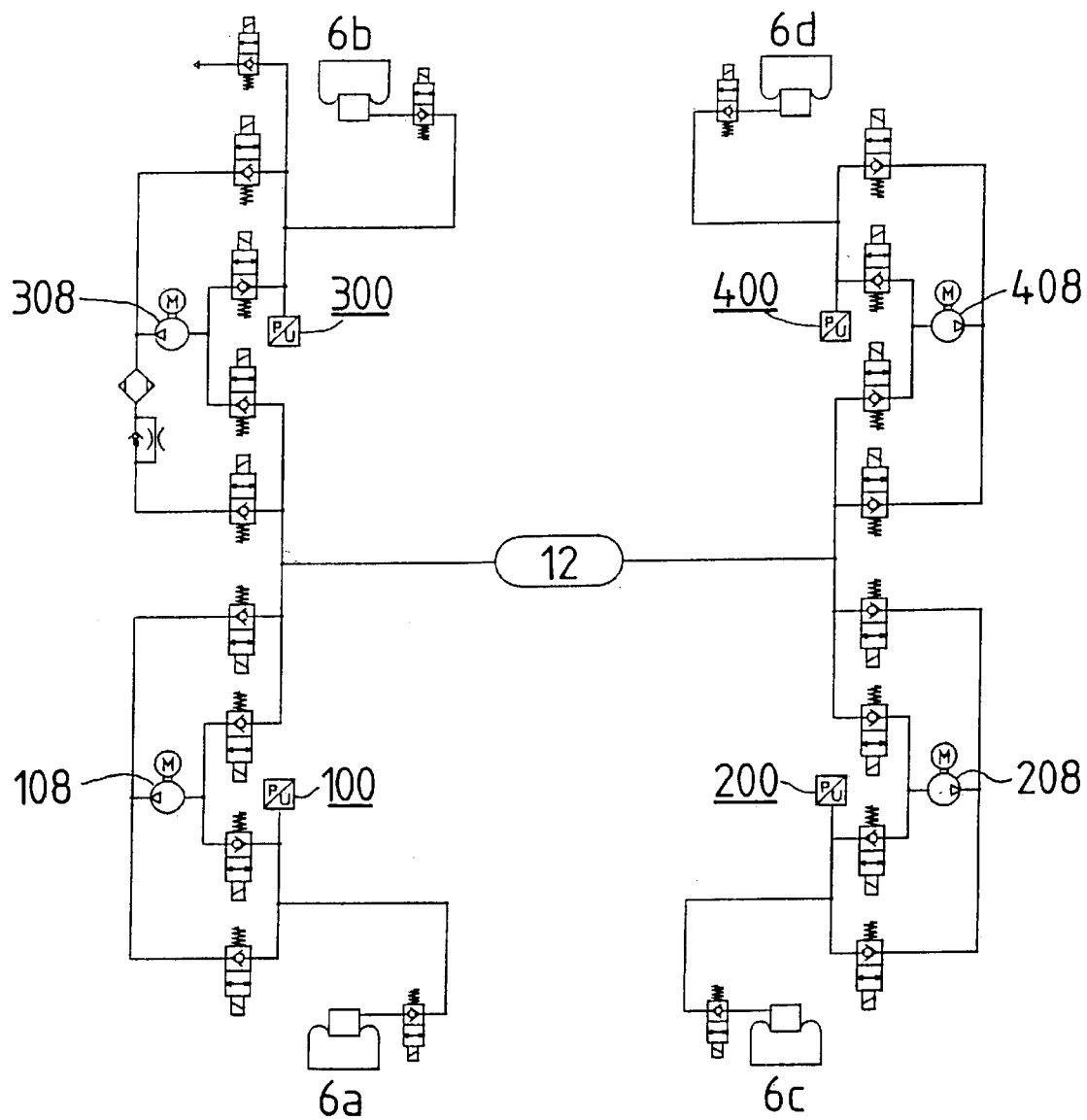

The idea to assign individual vehicle body components each with its own compressor is taken still further in the level control system shown in FIG. 5 in that each pressurized medium chamber 6a to 6d is assigned its own control loop 100, 200, 300 and 400. The control loops (100, 200, 300, 400) are, in turn, configured in the same manner as described above and each has its own compressor 108, 208, 308 and 408. In this way, each pressurized medium chamber 6a to 6d, which belongs to a corresponding wheel of the vehicle, can be individually filled or discharged independently of the other pressurized medium chambers. Still more rapid pressure changes are possible in the pressurized medium chambers and a still better control of the vehicle body is possible than with respect to the embodiments of the invention described up to now herein. For a simultaneous parallel operation of all control loops either to increase or to lower the pressure in the pressurized medium chambers, level changes of the vehicle can be carried out in a quarter of the time which would be necessary for a comparable system having only a single compressor. Additional programs for vehicle body control (for example, to compensate for pitch and roll movements) can be realized with simultaneous operation of the control loops 100, 200, 300 and 400 without additional devices being required.

Figure 6:
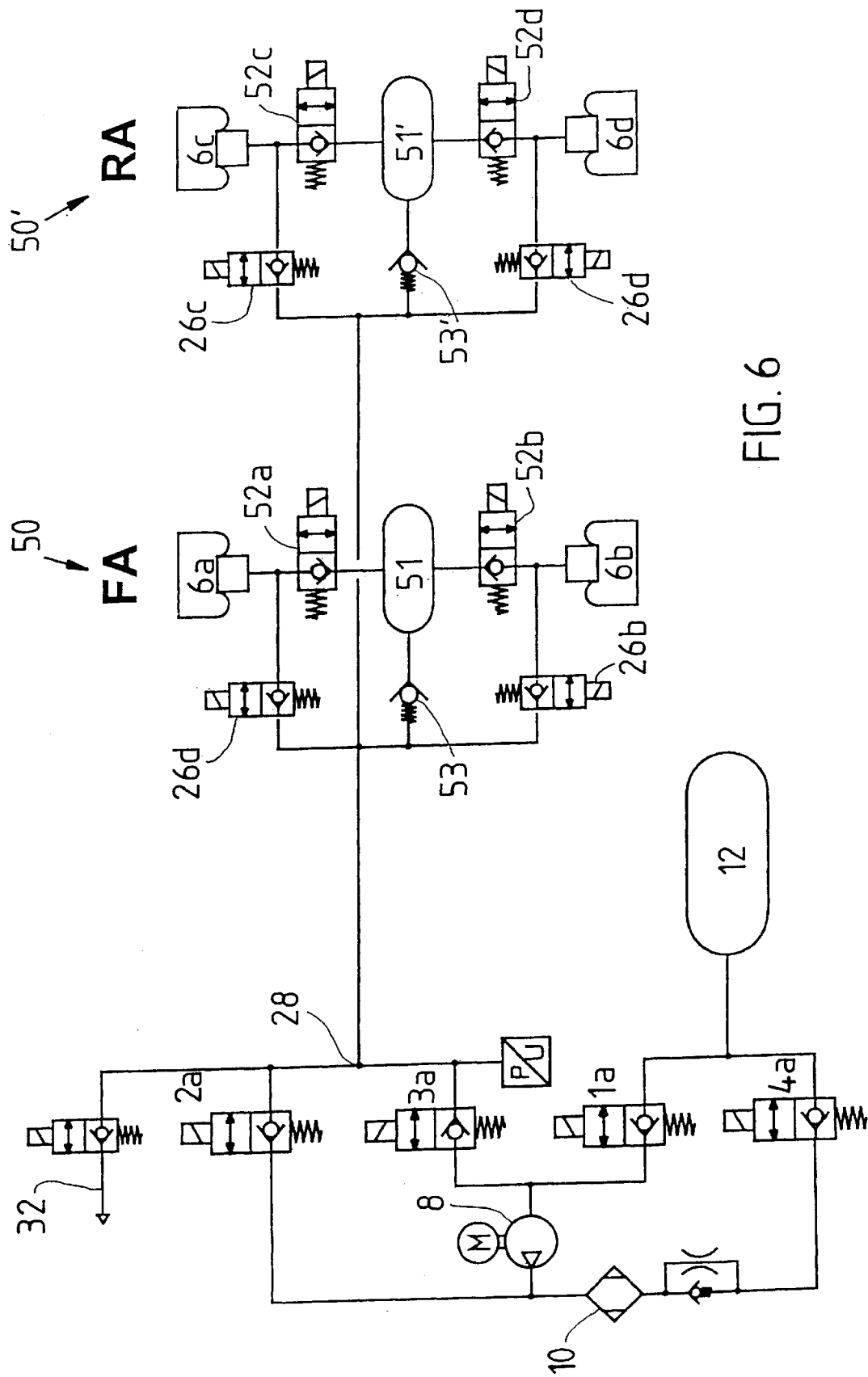

The level control system shown in FIG. 6 includes a control loop of the type described in connection with FIG. 1. In this level control system, the pressurized medium chambers, which belong to the forward axle, are combined to a group 50 and the pressurized medium chambers of the rearward axle are combined to group 50'. A vehicle with more than two axles would have correspondingly more of such groups. A pressurized medium store 51, 51' belongs to each group. The pressurized medium stores (51, 51') are connected via directional valves 52a to 52d with respective pressurized medium chambers 6a to 6d and are connected via respective check valves 53 and 53' to the point 28 of the supply unit. The valves 52a to 52d are preferably so configured that they can clear large flow cross sections. The check valves 53 and 53' block, starting from point 28, in the direction toward the pressurized medium stores (51, 51'). Directional valves 26a to 26d are connected ahead of the pressurized medium chambers 6a to 6d. The directional valves 26a to 26d have already been described in connection with FIG. 1.

Air can be supplied to the pressurized medium chambers 6a to 6d either via the valves 26a to 26d and the compressor 8 from the pressurized medium supply vessel 12 or from the pressurized medium stores 51 or 51' via the valves 52a to 52c. The discharge of air from the pressurized medium chambers 6a to 6d into the supply vessel 12 can take place via the valves 26a to 26d as already explained in connection with FIG. 1. Here, there would have to be a throughflow of long line systems having several valves as well as the air dryer which would affect the flow velocity. The discharge of air can, however, also take place into the stores 51 or 51' via the valves 52a to 52d which, because of the short lines and the adequately large cross sections of the valves 52a to 52d, would take place very rapidly. In this way, a rapid lowering of the vehicle is possible.

The air from the stores (51, 51') likewise reaches the supply vessel 12 via the check valves (53, 53') and the compressor 8. This outflow can take place slowly without movements of the vehicle being affected. The stores (51, 51') function thereby as intermediate stores or buffers which can take up large quantities of air rapidly in order to then slowly give up the air to the slower working components. The check valves (53, 53') prevent air from reaching the stores (51, 51') when filling the pressurized medium chambers (6a to 6d) via the compressor 8. A pressure increase of this kind in the stores would not only be an unnecessary waste of energy but it would even affect the operation of the system. In order to achieve a rapid discharging of the pressurized medium chambers 6a to 6d into the stores (51, 51') after opening the valves 52a to 52d, the pressure in the stores (51, 51') must be as low as possible and, in any event, however, be less than in the corresponding ones of the pressurized medium chambers.

Figure 7:
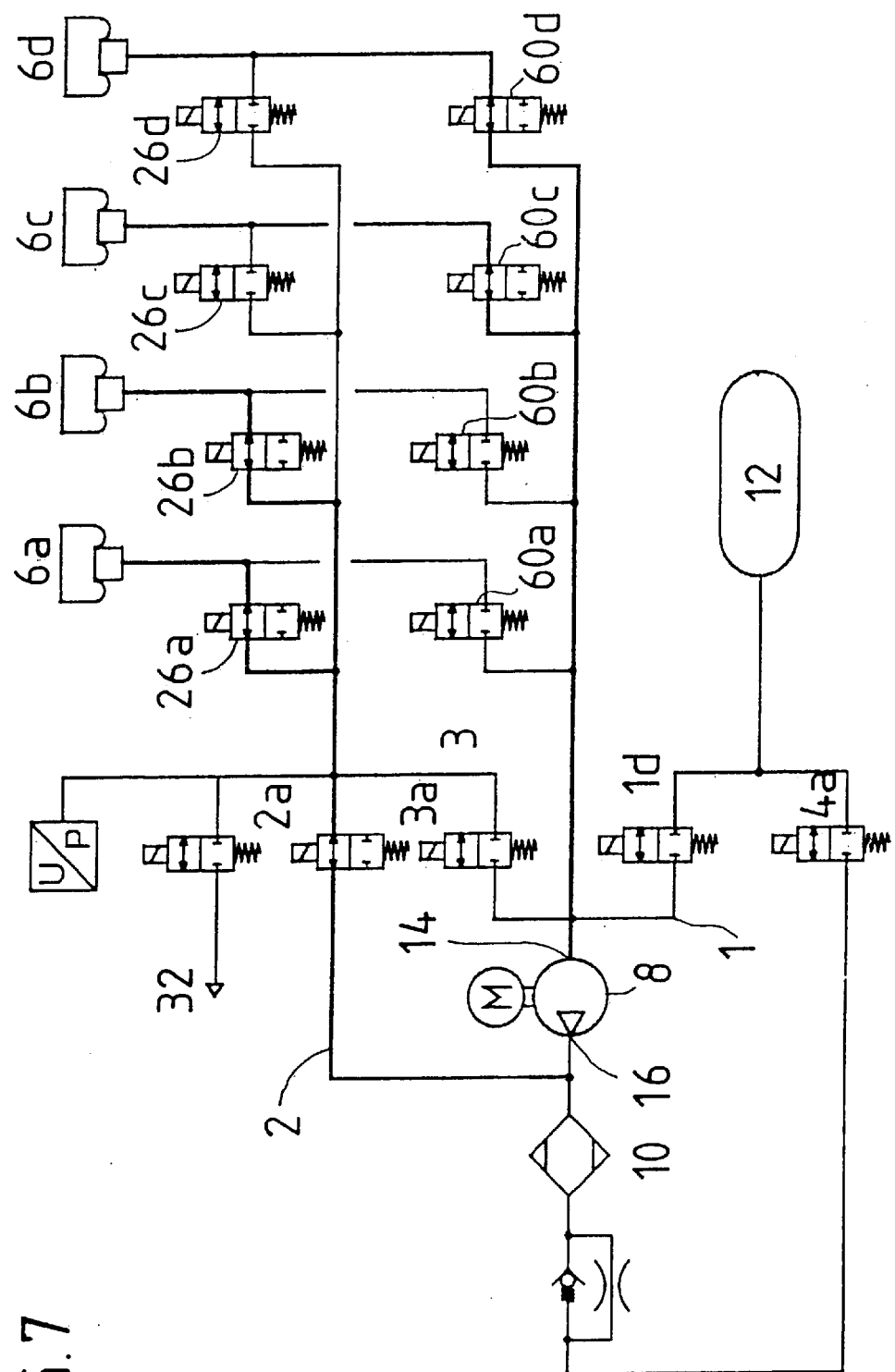

FIG. 7 shows a level control system having additional units for a control to compensate for pitch movements. Pitch movements are characterized as movements of the vehicle about an axis transverse to the direction of travel. Such movements occur, for example, when accelerating or braking. In FIG. 7, the units for compensating for pitch are shown in combination with the system of the type shown in FIG. 1. These units can, however, also be used in combination with another embodiment of the invention.

The pressurized medium chambers 6a to 6d are individually controllable via valves 26a to 26d and are connected to the compressor output 16 via the valve 2a and the line 2 and are connected to the compressor input 14 via the valve 3a and the line 3. Also, additional switchable directional valves 60a to 60d are provided which are connected ahead of corresponding ones of the pressurized medium chambers 6a to 6d and are connected with the first pressurized medium line 1 and the third pressurized medium line 2. A direct connection to the compressor input is provided by the pressurized medium line 1 and the pressurized medium line 3. With the aid of these valves, the pressurized medium chambers can exchange pressurized medium with each other.

A control to compensate for pitch can take place via a suitable control of the valves 26a to 26d, 60a to 60d and 2a and 3a in that the pressure in the pressurized medium chambers of the individual axle can be correspondingly reduced or increased via the compressor. When, for example, the forward axle is suspended via the pressurized medium chambers 6a and 6b and the rearward axle is suspended via the pressurized medium chambers 6c and 6d and the vehicle (for example when braking) has the tendency to drop forwardly and rise rearwardly, the valves 60c, 60d, 2a, 26a and 26b are switched so that they are cleared and air is pumped by the compressor 8 from the pressurized medium chambers of the rearward axle (6c, 6d) to those pressurized medium chambers of the forward axle (6a, 6b), in order to compensate for the pitch movement. When in an opposite movement (for example when accelerating), the forward part of the vehicle tends to move upwardly and the rearward part of the vehicle tends to move downwardly, the valves 60a, 60b, 3a, 26c and 26d are opened and air is pumped by the compressor 8 from the forward axle to the rearward axle. There is a flowthrough through the compressor 8 always in the same direction during its operation.

A roll compensation can be realized in the same way as the pitch compensation with the level control system of FIG. 7, that is, compensation of the rotational movements of the vehicle about its longitudinal axis in that pressurized medium is exchanged between the pressurized medium chambers lying on the left side and on the right side of the vehicle.

Figure 8:
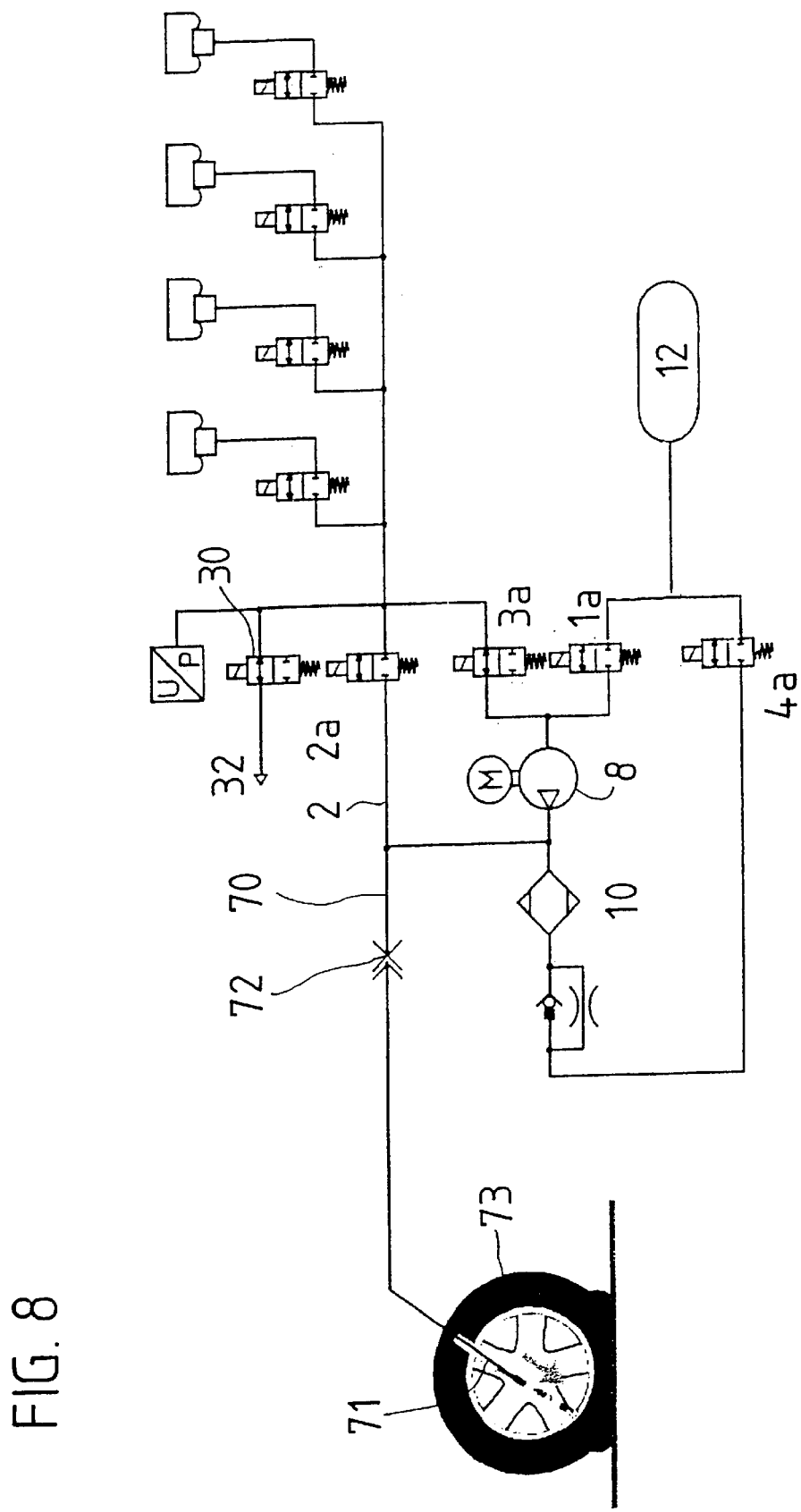

FIG. 8 shows a level control system which has a pressurized medium connection 72 for external apparatus and equipment. It is again a system of the type shown in FIG. 1. The pressurized medium connection 72 can, however, be applied to all level control systems according to the invention.

The pressurized medium line 70 leads to the pressurized medium connection 72 and branches from the pressurized medium line 2. The pressurized medium connection 72 has an lock which is only then opened when an external apparatus is connected so that no air can escape from the system and the user is relieved of the task of closing the line, for example, by actuating a valve.

The external unit is a tire fill connection 71 in FIG. 8 via which the tire 73 can be filled. The tire fill connection 71 is provided with a valve which is only then opened when the tire fill connection 71 is connected to a tire 73. To fill the tire 73, the intake valve 30 and the valve 3a are opened and the compressor 8 is switched on and air is pumped from the ambient into the tire 73. There is then no throughflow through the air dryer 10 because the filling of the tire does not require dry air. An unnecessary load on the dryer and a restriction of the flow can be avoided in this way.

The embodiment of the invention of FIG. 8 thereby makes specific components of the level control system useful for additional purposes without the main function of the level control system being in any way affected.

Figure 9:
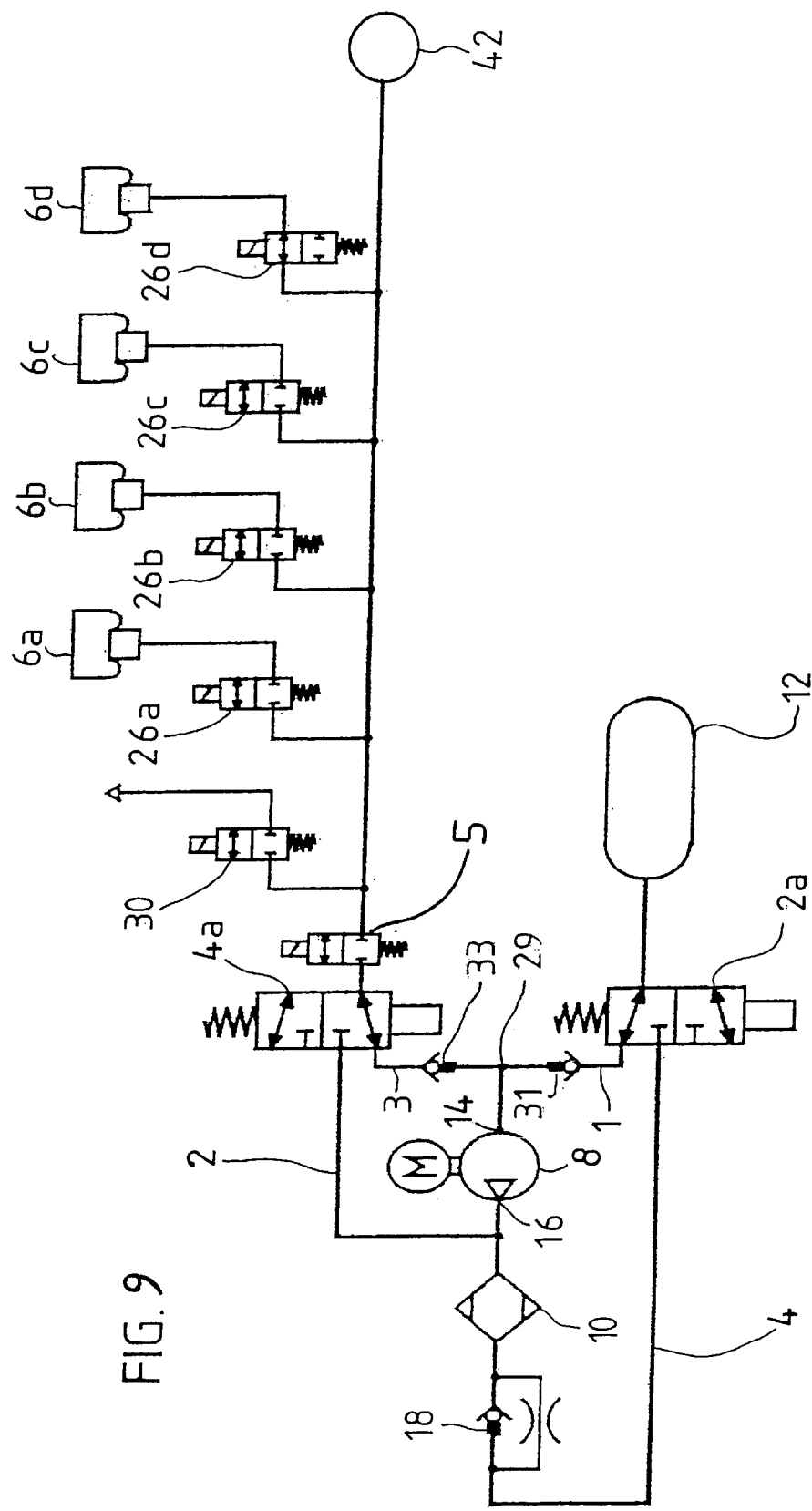

The embodiment of FIG. 9 shows a level control system which corresponds substantially to the control system shown in FIG. 2. In the control system of FIG. 9, a further controllable directional valve 5 is mounted in the pressurized air line 3 between the controllable directional valve 4a and the air springs 6a to 6d compared to the embodiment of FIG. 2. In this way, and for a closed directional valve 5, a pressure measurement is possible with the pressure sensor 42 in the air springs 6a to 6d without an air exchange and therefore without a pressure compensation between the respective air springs 6a to 6d and the air dryer 10 and/or the compressor 8. The filling or discharging of the air springs 6a to 6d or the connection of the compressor output 16 or the compressor input 14 and/or the air dryer 10 to the atmosphere via the controllable directional valve 30 is not influenced by the directional valve 5 which is then switched. It is also possible to reverse the switching function of the controllable directional valve 5 and switch the controllable directional valve 5 when making pressure measurements, for example, and not to switch for additional functions.

It is understood that the foregoing description is that of the preferred embodiments of the invention and that various changes and modifications may be made thereto without departing from the spirit and scope of the invention as defined in the appended claims.

What is claimed is:

1. A closed level control system for a vehicle having a vehicle body, vehicle axles and pressurized medium chambers with which the vehicle body is suspended relative to corresponding ones of said vehicle axles, the closed level control system comprising:

a single unsubdivided pressurized medium supply vessel for holding a medium under pressure as a pressurized medium;

a compressor for transferring said pressurized medium between said supply vessel and said pressurized medium chambers;

said compressor having an input and an output;

a first controllable directional valve switchable between a base position wherein no throughflow is permitted and a switched position wherein throughflow is permitted;

a first pressurized air line connecting said supply vessel to said input of said compressor via said first controllable directional valve;

a second controllable directional valve switchable between a base position wherein no throughflow is permitted and a switched position wherein throughflow is permitted;

a second pressurized air line connecting said output of said compressor to said pressurized medium chambers via said second controllable directional valve;

said pressurized, medium being transmitted from said supply vessel to said pressurized medium chambers by said compressor when said first and second controllable directional valves are in said switched position;

a third controllable directional valve switchable between a base position wherein no throughflow is permitted and a switched position wherein throughflow is permitted;

a third pressurized air line connecting said input of said compressor to said pressurized medium chambers via said third controllable directional valve;

a fourth controllable directional valve switchable between a base position wherein no throughflow is permitted and a switched position wherein throughflow is permitted;

a fourth pressurized air line connecting said output of said compressor to said pressurized medium supply vessel via said fourth controllable directional valve;

said pressurized medium being transmitted from each of said pressurized medium chambers to said supply vessel by said compressor when said third and fourth controllable directional valves are in said switched position;

said pressurized medium being transmitted from said supply vessel to said pressurized medium chambers by said compressor when said first and second controllable directional valves are in said switched position;

an air dryer mounted in said fourth pressurized air line;

an intake valve switchable between a base position wherein no throughflow is permitted and a switched position wherein throughflow is permitted;

an intake line ending at said intake valve and connecting said input of said compressor to the atmosphere when said intake valve is in said switched position;

a discharge valve switchable between a base position wherein no throughflow is permitted and a switched position wherein throughflow is permitted;

a discharge line branching off from said fourth pressurized air line at a branch point between said output of said compressor and said air dryer and ending at said discharge valve; and, said supply vessel being connectable to the atmosphere via said air dryer and said discharge line when said discharge valve is in said switched position.

2. The closed level control system of claim 1, wherein:

said first to fourth controllable directional valves are mounted in said first to fourth pressurized air lines, respectively;

said first to fourth pressurized air lines are cleared in a first switching state of said first to fourth controllable directional valves and blocked in a second switching state of said first to fourth directional valves;

said first and fourth pressurized air lines are connected together at a first point between said first and fourth controllable directional valves and said pressurized medium supply vessel and, from said first point, said first and fourth pressurized air lines are connected to said pressurized medium supply vessel via a first common pressurized air line; and, said second and third pressurized air lines are connected together at a second point between said second and third controllable directional valves and said pressurized medium chambers and, from said second point, said second and third pressurized air lines are connected to said pressurized medium chambers via a second common pressurized air line.

3. A closed level control system for a vehicle having a vehicle body, vehicle axles and pressurized medium chambers with which the vehicle body is suspended relative to corresponding ones of said vehicle axles, the closed level control system comprising:

a pressurized medium supply vessel for holding a medium under pressure as a pressurized medium;

a compressor for transferring said pressurized medium between said supply vessel and said pressurized medium chambers;

said compressor having an input and an output;

a first controllable directional valve switchable between a base position wherein no throughflow is permitted and a switched position wherein throughflow is permitted;

a first pressurized air line connecting said supply vessel to said input of said compressor via said first controllable directional valve;

a second controllable directional valve switchable between a base position wherein no throughflow is permitted and a switched position wherein throughflow is permitted;

a second pressurized air line connecting said output of said compressor to said pressurized medium chambers via said second controllable directional valve;

said pressurized medium being transmitted from said supply vessel to said pressurized medium chambers by said compressor when said first and second controllable directional valves are in said switched position;

a third controllable directional valve switchable between a base position wherein no throughflow is permitted and a switched position wherein throughflow is permitted;

a third pressurized air line connecting said input of said compressor to said pressurized medium chambers via said third controllable directional valve;

a fourth controllable directional valve switchable between a base position wherein no throughflow is permitted and a switched position wherein throughflow is permitted;

a fourth pressurized air line connecting said output of said compressor to said pressurized medium supply vessel via said fourth controllable directional valve;

said pressurized medium being transmitted from each of said pressurized medium chambers to said supply vessel by said compressor when said third and fourth controllable directional valves are in said switched position;

an air dryer mounted in said fourth pressurized air line;

an intake valve switchable between a base position wherein no throughflow is permitted and a switched position wherein throughflow is permitted;

an intake line ending at said intake valve and connecting said input of said compressor to the atmosphere when said intake valve is in said switched position;

a discharge valve switchable between a base position wherein no throughflow is permitted and a switched position wherein throughflow is permitted;

a discharge line branching off from said fourth pressurized air line at a branch point between said output of said compressor and said air dryer and ending at said discharge valve;

said supply vessel being connectable to the atmosphere via said air diver and said discharge line when said discharge valve is in said switched position;

said first and fourth controllable directional valves are combined to form a first composite directional valve;

said second and third controllable directional valves are combined to form a second composite directional valve;

each of said first and second composite controllable directional valves are switchable between first and second switching states;

said first and second controllable composite directional valves can assume at least two switching states;

said first pressurized air line is closed with said first controllable composite directional valve and said second pressurized air line is cleared with said second controllable composite directional valve; said fourth pressurized air line is blocked with said first controllable composite directional valve and said third pressurized air line is blocked with said second controllable composite directional valve when pressurized air is to be transferred from said pressurized medium chambers; and, said first and second controllable composite directional valves are a first switching state;

said third pressurized air line is cleared with said second controllable composite directional valve and said fourth pressurized air line is cleared with said first controllable composite directional valve; and, said first pressurized air line is blocked with said first controllable composite directional valve and said second pressurized air line is blocked with said second controllable composite directional valve when pressurized air is to be transferred from said pressurized medium chambers to said pressurized medium supply vessel; and, said first and second controllable composite directional valves are in a second switching state.

4. The closed level control system of claim 3, wherein:

said first pressurized air line starting from said pressurized medium supply vessel and said third pressurized air line starting from said pressurized medium chambers are both terminated in a common third point connected directly to said input of said compressor.

5. The closed level control system of claim 4, wherein said system comprises:

a first check valve open to said input of said compressor;

said first check valve is disposed in said first pressurized air line between said third point and said first controllable composite directional valve;

a second check valve open to said input of said compressor; and, said second check valve is disposed in said third pressurized air line between said third point and said second controllable composite directional valve.

6. The closed level control system of claim 3, wherein said system comprises:

a fifth controllable directional valve mounted in said third pressurized air line between said fourth controllable directional valve and said pressurized medium chambers; and, said fifth controllable directional valve is switchable between a first switching state wherein said third pressurized air line is blocked and a second position wherein said third pressurized air line is cleared.

7. A closed level control system for a vehicle having a vehicle body, vehicle axles and pressurized medium chambers with which the vehicle body is suspended relative to corresponding ones of said vehicle axles, the closed level control system comprising:

a pressurized medium supply vessel for holding a medium under pressure as a pressurized medium;

a compressor for transferring said pressurized medium between said supply vessel and said pressurized medium chambers;

said compressor having an input and an output;

a first controllable directional valve switchable between a base position wherein no throughflow is permitted and a switched position wherein throughflow is permitted;

a first pressurized air line connecting said supply vessel to said input of said compressor via said first controllable directional valve;

a second controllable directional valve switchable between a base position wherein no throughflow is permitted and a switched position wherein throughflow is permitted;

a second pressurized air line connecting said output of said compressor to said pressurized medium chambers via said second controllable directional valve;

said pressurized medium being transmitted from said supply vessel to said pressurized medium chambers by said compressor when said first and second controllable directional valves are in said switched position;

a third controllable directional valve switchable between a base position wherein no throughflow is permitted and a switched position wherein throughflow is permitted;

a third pressurized air line connecting said input of said compressor to said pressurized medium chambers via said third controllable directional valve;

a fourth controllable directional valve switchable between a base position wherein no throughflow is permitted and a switched position wherein throughflow is permitted;

a fourth pressurized air line connecting said output of said compressor to said pressurized medium supply vessel via said fourth controllable directional valve;

said pressurized medium being transmitted from each of said pressurized medium chambers to said supply vessel by said compressor when said third and fourth controllable directional valves are in said switched position;

an air dryer mounted in said fourth pressurized air line;

an intake valve switchable between a base position wherein no throughflow is permitted and a switched position wherein throughflow is permitted;

an intake line ending at said intake valve and connecting said input of said compressor to the atmosphere when said intake valve is in said switched position;

a discharge valve switchable between a base position wherein no throughflow is permitted and a switched position wherein throughflow is permitted;

a discharge line branching off from said fourth pressurized air line at a branch point between said output of said compressor and said air dryer and ending at said discharge valve;

said supply vessel being connectable to the atmosphere via said air dryer and said discharge line when said discharge valve is in said switched position;

said first to fourth controllable directional valves are mounted in said first to fourth pressurized air lines, respectively;

said first to fourth pressurized air lines are cleared in a first switching state of said first to fourth controllable directional valves and blocked in a second switching state of said first to fourth directional valves;

said first and fourth pressurized air lines are connected together at a first point between said first and fourth controllable directional valves and said pressurized medium supply vessel and, from said first point, said first and fourth pressurized air lines are connected to said pressurized medium supply vessel via a first common pressurized air line;

said second and third pressurized air lines are connected together at a second point between said second and third controllable directional valves and said pressurized medium chambers and, from said second point, said second and third pressurized air lines are connected to said pressurized medium chambers via a second common pressurized air line; and, wherein said second directional valve is mounted between said branch point and said second point; and, said second directional valve is switchable between a first switching state wherein said discharge line is blocked and a second switching state wherein said discharge line is cleared so that said intake valve can be used at the same time as said discharge valve.

8. The closed level control system of claim 7, wherein said system comprises an additional pressurized air line which branches off from said second common pressurized air line; and, said intake valve is mounted in said additional pressurized air line.

9. The closed level control system of claim 8, wherein said discharge line corresponds to said second pressurized air line between said branch point and said connecting point.

10. A closed level control system for a vehicle having a vehicle body, vehicle axles and pressurized medium chambers with which the vehicle body is suspended relative to corresponding ones of said vehicle axles, the closed level control system comprising:

a pressurized medium supply vessel for holding a medium under pressure as a pressurized medium;

a compressor for transferring said pressurized medium between said supply vessel and said pressurized medium chambers;

said compressor having an input and an output;

a first controllable directional valve switchable between a base position wherein no throughflow is permitted and a switched position wherein throughflow is permitted;

a first pressurized air line connecting said supply vessel to said input of said compressor via said first controllable directional valve;

a second controllable directional valve switchable between a base position wherein no throughflow is permitted and a switched position wherein throughflow is permitted;

a second pressurized air line connecting said output of said compressor to said pressurized medium chambers via said second controllable directional valve;

said pressurized medium being transmitted from said supply vessel to said pressurized medium chambers by said compressor when said first and second controllable directional valves are in said switched position;

a third controllable directional valve switchable between a base position wherein no throughflow is permitted and a switched position wherein throughflow is permitted;

a third pressurized air line connecting said input of said compressor to said pressurized medium chambers via said third controllable directional valve;

a fourth controllable directional valve switchable between a base position wherein no throughflow is permitted and a switched position wherein throughflow is permitted;

a fourth pressurized air line connecting said output of said compressor to said pressurized medium supply vessel via said fourth controllable directional valve;

said pressurized medium being transmitted from each of said pressurized medium chambers to said supply vessel by said compressor when said third and fourth controllable directional valves are in said switched position;

an air dryer mounted in said fourth pressurized air line;

an intake valve switchable between a base position wherein no throughflow is permitted and a switched position wherein throughflow is permitted;

an intake line ending at said intake valve and connecting said input of said compressor to the atmosphere when said intake valve is in said switched position;

a discharge valve switchable between a base position wherein no throughflow is permitted and a switched position wherein throughflow is permitted;

a discharge line branching off from said fourth pressurized air line at a branch point between said output of said compressor and said air dryer and ending at said discharge valve;

said supply vessel being connectable to the atmosphere via said air dryer and said discharge line when said discharge valve is in said switched position;

said first and fourth controllable directional valves are combined to form a first composite directional valve;

said second and third controllable directional valves are combined to form a second composite directional valve;

each of said first and second composite controllable directional valves are switchable between first and second switching states;

said first pressurized air line is cleared with said first composite directional valve and said second pressurized air line is cleared with said second composite directional valve when pressurized air is to be transferred from said pressurized medium supply vessel into said pressurized medium chambers with both of said composite directional valves being in said first switching states; and, said third pressurized air line is cleared with said first composite directional valve and said fourth pressurized air line is cleared with said second composite directional valve when pressurized air is to be transferred from said pressurized medium chambers into said pressurized medium supply vessel with both of said composite directional valves being in said second switching state.

11. The closed level control system of claim 1, wherein said system comprises:

a check valve open toward said pressurized medium supply vessel;

said check valve is mounted in said fourth pressurized air line between said air dryer and said pressurized medium supply vessel;

a bridging pressurized air line bridging said check valve; and, a throttle mounted in said bridging pressurized air line.

12. A closed level control system for a vehicle having a vehicle body, vehicle axles and pressurized medium chambers with which the vehicle body is suspended relative to corresponding ones of said vehicle axles, the closed level control system comprising:

a pressurized medium supply vessel for holding a medium under pressure as a pressurized medium;

a compressor for transferring said pressurized medium between said supply vessel and said pressurized medium chambers;

said compressor having an input and an output;

a first controllable directional valve switchable between a base position wherein no throughflow is permitted and a switched position wherein throughflow is permitted;

a first pressurized air line connecting said supply vessel to said input of said compressor via said first controllable directional valve;

a second controllable directional valve switchable between a base position wherein no throughflow is permitted and a switched position wherein throughflow is permitted;

a second pressurized air line connecting said output of said compressor to said pressurized medium chambers via said second controllable directional valve;

said pressurized medium being transmitted from said supply vessel to said pressurized medium chambers by said compressor when said first and second controllable directional valves are in said switched position;

a third controllable directional valve switchable between a base position wherein no throughflow is permitted and a switched position wherein throughflow is permitted;

a third pressurized air line connecting said input of said compressor to said pressurized medium chambers via said third controllable directional valve;

a fourth controllable directional valve switchable between a base position wherein no throughflow is permitted and a switched position wherein throughflow is permitted;

a fourth pressurized air line connecting said output of said compressor to said pressurized medium supply vessel via said fourth controllable directional valve;

said pressurized medium being transmitted from each of said pressurized medium chambers to said supply vessel by said compressor when said third and fourth controllable directional valves are in said switched position;

an air dryer mounted in said fourth pressurized air line;

an intake valve switchable between a base position wherein no throughflow is permitted and a switched position wherein throughflow is permitted;

an intake line ending at said intake valve and connecting said input of said compressor to the atmosphere when said intake valve is in said switched position;

a discharge valve switchable between a based position wherein no throughflow is permitted and a switched position wherein throughflow is permitted;

a discharge line branching off from said fourth pressurized air line at a branch Point between said output of said compressor and said air dryer and ending at said discharge valve;

said supply vessel being connectable to the atmosphere via said air dryer and said discharge line when said discharge valve is in said switched position;

a pressure sensor mounted in a pressurized air line extending from said pressurized medium chambers;

ancillary controllable directional valves connected between corresponding ones of said pressurized medium chambers and said pressure sensor; and, each of said ancillary controllable directional valves are switchable between a first switching state wherein the corresponding pressurized medium chamber is separated from said pressure sensor and a second switching state wherein the corresponding one of said pressurized medium chambers is connected to said pressure sensor.

13. The closed level control system of claim 1, wherein said system comprises:

a plurality of said compressor corresponding to said pressurized medium chambers;

pressurized medium can be transferred from said pressurized medium supply vessel into each pressurized medium chamber via a corresponding one of said compressors; the corresponding compressor input is then connected to the pressurized medium supply vessel via a first pressurized air line which is cleared by a first directional valve and the corresponding compressor output is then connected to the pressurized medium chamber corresponding to the compressor via a second pressurized air line cleared by a second directional valve;

pressurized medium can be transferred from each of said pressurized medium chambers into said pressurized medium supply vessel via a corresponding one of said compressors; the corresponding one of said compressor input is then connected to the corresponding pressurized medium chambers via a third pressurized air line which is cleared by a third directional valve and the corresponding compressor output is then connected to said pressurized medium supply vessel via a fourth pressurized air line cleared via a fourth directional valve;

an air dryer is mounted in said fourth pressurized air line next to one of said compressors;

one of said compressors is connectable to the atmosphere via said intake line;

said discharge line branching off from said fourth pressurized air line at said branch point located between the output of one of said compressors and said air dryer; and, said discharge line ending in said discharge valve so that said pressurized medium supply vessel can be connected to the atmosphere via said air dryer and said discharge line.

14. The closed level control system of claim 13, wherein said vehicle has two axles and said compressors are each assigned to the pressurized medium chambers corresponding to the axles, respectively.

15. The closed level control system of claim 13, wherein each of said pressurized medium chambers is assigned to a corresponding one of said compressors.

16. The closed level control system of claim 13, wherein:

said air dryer is the only air dryer;

said intake line with said intake valve is the only intake line and intake valve; and, said discharge line with said discharge valve is the only discharge line and discharge valve.

17. The closed level control system of claim 1, wherein the pressurized medium chambers of each vehicle axle are combined to a group and each group is assigned a pressurized medium supply vessel which is connected to the pressurized air lines leading to the compressor input and the compressor output and which is connected to the pressurized medium chambers via directional valves.

18. The closed level control system of claim 16, wherein the pressurized medium supply vessels are connected to the pressurized air lines leading to the compressor input and the compressor output via check valves; and, the check valves block in flow direction to the pressurized medium supply vessels and each of said pressurized medium supply vessels is assigned a corresponding one of said check valves.

19. A closed level control system for a vehicle having a vehicle body, vehicle axles and pressurized medium chambers with which the vehicle body is suspended relative to corresponding ones of said vehicle axles, the closed level control system comprising:

a pressurized medium supply vessel for holding a medium under pressure as a pressurized medium;

a compressor for transferring said pressurized medium between said supply vessel and said pressurized medium chambers;

said compressor having an input and an output;

a first controllable directional valve switchable between a base position wherein no throughflow is permitted and a switched position wherein throughflow is permitted;

a first pressurized air line connecting said supply vessel to said input of said compressor via said first controllable directional valve;

a second controllable directional valve switchable between a base position wherein no throughflow is permitted and a switched position wherein throughflow is permitted;

a second pressurized air line connecting said output of said compressor to said pressurized medium chambers via said second controllable directional valve;

said pressurized medium being transmitted from said supply vessel to said pressurized medium chambers by said compressor when said first and second controllable directional valves are in said switched position;

a third controllable directional valve switchable between a base position wherein no throughflow is permitted and a switched position wherein throughflow is permitted;

a third pressurized air line connecting said input of said compressor to said pressurized medium chambers via said third controllable directional valve;

a fourth controllable directional valve switchable between a base position wherein no throughflow is permitted and a switched position wherein throughflow is permitted;

a fourth pressurized air line connecting said output of said compressor to said pressurized medium supply vessel via said fourth controllable directional valve;

said pressurized medium being transmitted from each of said pressurized medium chambers to said supply vessel by said compressor when said third and fourth controllable directional valves are in said switched position;

an air dryer mounted in said fourth pressurized air line;

an intake valve switchable between a base position wherein no throughflow is permitted and a switched position wherein throughflow is permitted;

an intake line ending at said intake valve and connecting said input of said compressor to the atmosphere when said intake valve is in said switched position;

a discharge valve switchable between a base position wherein no throughflow is permitted and a switched position wherein throughflow is permitted;

a discharge line branching off from said fourth pressurized air line at a branch point between said output of said compressor and said air dryer and ending at said discharge valve;

said supply vessel being connectable to the atmosphere via said air dryer and said discharge line when said discharge valve is in said switched position;

directional valves are being assigned to said pressurized medium chambers, respectively; and, said pressurized medium chambers being connected to the first pressurized air line and to the third pressurized air line via said directional valves.

20. A closed level control system for a vehicle having a vehicle body, vehicle axles and pressurized medium chambers with which the vehicle body is suspended relative to corresponding ones of said vehicle axles, the closed level control system comprising:

a pressurized medium supply vessel for holding a medium under pressure as a pressurized medium;

a compressor for transferring said pressurized medium between said supply vessel and said pressurized medium chambers;

said compressor having an input and an output;

a first controllable directional valve switchable between a base position wherein no throughflow is permitted and a switched position wherein throughflow is permitted;

a first pressurized air line connecting said supply vessel to said input of said compressor via said first controllable directional valve;

a second controllable directional valve switchable between a base position wherein no throughflow is permitted and a switched position wherein throughflow is permitted;

a second pressurized air line connecting said output of said compressor to said pressurized medium chambers via said second controllable directional valve;

said pressurized medium being transmitted from said supply vessel to said pressurized medium chambers by said compressor when said first and second controllable directional valves are in said switched position;

a third controllable directional valve switchable between a base position wherein no throughflow is permitted and a switched position wherein throughflow is permitted;

a third pressurized air line connecting said input of said compressor to said pressurized medium chambers via said third controllable directional valve;

a fourth controllable directional valve switchable between a base position wherein no throughflow is permitted and a switched position wherein throughflow is permitted;

a fourth pressurized air line connecting said output of said compressor to said pressurized medium supply vessel via said fourth controllable directional valve;

said pressurized medium being transmitted from each of said pressurized medium chambers to said supply vessel by said compressor when said third and fourth controllable directional valves are in said switched position;

an air dryer mounted in said fourth pressurized air line;

an intake valve switchable between a base position wherein no throughflow is permitted and a switched position wherein throughflow is permitted;

an intake line ending at said intake valve and connecting said input of said compressor to the atmosphere when said intake valve is in said switched position;

a discharge valve switchable between a base position wherein no throughflow is permitted and a switched position wherein throughflow is permitted;

a discharge line branching off from said fourth pressurized air line at a branch point between said output of said compressor and said air dryer and ending at said discharge valve;

said supply vessel being connectable to the atmosphere via said air dryer and said discharge line when said discharge valve is in said switched position; and, extra air lines suitable for connecting to an external apparatus and said extra line is connected to the pressurized air lines of said system.

21. The closed level control system of claim 20, wherein said extra line includes a valve which is only then opened when an external apparatus is connected to said extra line.

22. The closed level control system of claim 20, wherein said extra external apparatus is a tire filling apparatus.

23. The closed level control system of claim 20, wherein said extra line is connected to the pressurized air line connected to the compressor output.

* * * * *

UNITED STATES PATENT AND TRADEMARK OFFICE
CERTIFICATE OF CORRECTION

PATENT NO. : 6,726,189 B2
DATED : April 27, 2004
INVENTOR(S) : Uwe Folchert et al.

It is certified that error appears in the above-identified patent and that said Letters Patent is hereby corrected as shown below:

Column 11,
Line 17, delete "blocked," and substitute -- blocked -- therefor.

Column 17,
Line 48, delete "an" and substitute -- a -- therefor.

Column 18,
Line 50, delete "pressurized," and substitute -- pressurized -- therefor.

Column 20,
Line 48, delete "diver" and substitute -- dryer -- therefor.

Column 25,
Line 27, delete "based" and substitute -- base -- therefor.
Line 31, delete "Point" and substitute -- point -- therefor.
Lien 50, delete "compressor" and substitute -- compressors -- therefor.

Column 27,
Line 41, delete "are".
Line 58, delete "extra".

Signed and Sealed this

Thirty-first Day of May, 2005

JON W. DUDAS
*Director of the United States Patent and Trademark Office*